US012438681B2

(12) United States Patent
Hu et al.

(10) Patent No.: US 12,438,681 B2
(45) Date of Patent: Oct. 7, 2025

(54) ENHANCED RESOURCE UNIT ALLOCATION SUBFIELD DESIGN FOR EXTREME HIGH-THROUGHPUT SYSTEMS

(71) Applicant: MediaTek Singapore Pte. Ltd., Singapore (SG)

(72) Inventors: Shengquan Hu, San Jose, CA (US); Jianhan Liu, San Jose, CA (US); Thomas Edward Pare, Jr., San Jose, CA (US)

(73) Assignee: MediaTek Singapore Pte. Ltd., Singapore (SG)

( * ) Notice: Subject to any disclaimer, the term of this patent is extended or adjusted under 35 U.S.C. 154(b) by 129 days.

(21) Appl. No.: 17/178,139

(22) Filed: Feb. 17, 2021

(65) Prior Publication Data

US 2021/0281384 A1 Sep. 9, 2021

Related U.S. Application Data

(60) Provisional application No. 63/030,332, filed on May 27, 2020, provisional application No. 63/026,757, filed on May 19, 2020, provisional application No. 62/992,231, filed on Mar. 20, 2020, provisional application No. 62/984,347, filed on Mar. 3, 2020.

(51) Int. Cl.

| | |
|---|---|
| ***H04L 5/00*** | (2006.01) |
| ***H04B 7/0452*** | (2017.01) |
| *H04W 84/12* | (2009.01) |

(52) U.S. Cl.

CPC ......... *H04L 5/0094* (2013.01); *H04B 7/0452* (2013.01); *H04L 5/0007* (2013.01); *H04W 84/12* (2013.01)

(58) Field of Classification Search

USPC .......................................................... 370/329

See application file for complete search history.

(56) References Cited

U.S. PATENT DOCUMENTS

| | | | | |
|---|---|---|---|---|
| 9,867,189 | B2 | 1/2018 | Lee et al. | |
| 10,153,932 | B2 | 12/2018 | Montreuil et al. | |
| 11,490,261 | B2 * | 11/2022 | Jang | H04L 5/001 |
| 2017/0094664 | A1 | 3/2017 | Lee et al. | |
| 2018/0109300 | A1 * | 4/2018 | Choi | H04L 5/0094 |

(Continued)

FOREIGN PATENT DOCUMENTS

| | | | |
|---|---|---|---|
| CN | 107872307 | A | 4/2018 |
| CN | 107925470 | A | 4/2018 |

(Continued)

OTHER PUBLICATIONS

Park et al. Multiple RU Aggregation, Jan. 13, 2020, IEEE (Year: 2020).*

(Continued)

*Primary Examiner* — Luna Weissberger

(74) *Attorney, Agent, or Firm* — Andy M. Han; Han IP PLLC

(57) ABSTRACT

A method pertaining to enhanced resource unit (RU) allocation subfield design for extreme high-throughput (EHT) systems involves determining one or more RUs based on an RU allocation table. The method also involves performing wireless communications using the one or more RUs. The RU allocation table includes at least a combination of a plurality of aggregations of multiple RUs.

20 Claims, 32 Drawing Sheets

(56) References Cited

U.S. PATENT DOCUMENTS

| | | | |
|---|---|---|---|
| 2019/0260531 A1 | 8/2019 | Chen et al. | |
| 2019/0380117 A1 | 12/2019 | Verma et al. | |
| 2021/0176643 A1 | 6/2021 | Jang et al. | |
| 2021/0266098 A1* | 8/2021 | Cao | H04L 1/0643 |

FOREIGN PATENT DOCUMENTS

| | | | | | |
|---|---|---|---|---|---|
| GB | 2567481 | A | * | 4/2019 | H04L 5/0055 |
| WO | WO-2016167608 | A1 | * | 10/2016 | H04B 7/06 |
| WO | WO 2021030234 | A2 | | 2/2021 | |
| WO | WO 2021030234 | A3 | | 2/2021 | |
| WO | WO-2021139900 | A1 | * | 7/2021 | H04L 5/0053 |

OTHER PUBLICATIONS

Park et al. Multiple RU Aggregation, Jan. 13, 2020, IEEE 802.11 (Year: 2020).*

Taiwan Intellectual Property Office, Office Action for Taiwan Patent Application No. 110107272, Sep. 7, 2021.

Taiwan Intellectual Property Office, Office Action for Taiwan Patent Application No. 110107272, Dec. 16, 2021.

European Patent Office, European Search Report for European Patent Application No. 21158432.1, Jun. 17, 2021.

Oded Redlich et al. (Huawei), "Discussion on Multi-RU in 802.11be", IEEE Draft, 11-20-0128-01-00BE-Discussion-on-Multi-RU-in-802-11BE, IEEE-SA Mentor, Piscataway, NJ, USA.

Jianhan Liu et al. (Mediatek), "Multiple RU Combinations for EHT", IEEE Draft, 11-19-1907-00-00BE-Multiple-RU-Combinations-for-EHT, IEEE-SA Mentor, Piscataway, NJ, USA.

Dhina National Intellectual Property Administration, Third Office Action in China Patent Application No. 202110231882.2, Jun. 1, 2024.

Eunsung Park et al.: "Multiple RU Aggregation", IEEE 802.11-20/0023r2, Jan. 16, 2020, pp. 2-26.

European Patent Office, First Office Action in European Patent Application No. 21158432.1, Nov. 14, 2024.

Eunsung Park et al (LG Electronics): "Multiple RU Aggregation", IEEE 802.11-20/0023r2, Jan. 13, 2020, pp. 2-26.

Dongguk Lim (LG Electronics): "Signaling of RU allocation in 11be", IEEE 802.11-20/0652, Apr. 24, 2020.

* cited by examiner

200

| B9 | B8B7....B1B0 | #1 | #2 | #3 | #4 | #5 | #6 | #7 | #8 | #9 |
|---|---|---|---|---|---|---|---|---|---|---|
| 0 | 0 ("000000000") | 26 | 26 | 26 | 26 | 26 | 26 | 26 | 26 | 26 |
| 0 | 1 ("000000001") | 26 | 26 | 26 | 26 | 26 | 26 | 26 | 52 | |
| 0 | 2("000000010") | 26 | 26 | 26 | 26 | 26 | 52 | | 26 | 26 |
| 0 | 3 ("000000011") | 26 | 26 | 26 | 26 | 26 | 52 | | 52 | |
| 0 | 4 ("000000100") | 26 | 26 | 52 | | 26 | 26 | 26 | 26 | 26 |
| 0 | 5 ("000000101") | 26 | 26 | 52 | | 26 | 26 | 26 | 52 | |
| 0 | 6 ("000000110") | 26 | 26 | 52 | | 26 | 52 | | 26 | 26 |
| 0 | 7 ("000000111") | 26 | 26 | 52 | | 26 | 52 | | 52 | |
| 0 | 8 ("000001000") | 52 | | 26 | 26 | 26 | 26 | 26 | 26 | 26 |
| 0 | 9 ("000001001") | 52 | | 26 | 26 | 26 | 26 | 26 | 52 | |
| 0 | 10 ("000001010") | 52 | | 26 | 26 | 26 | 52 | | 26 | 26 |
| 0 | 11 ("000001011") | 52 | | 26 | 26 | 26 | 52 | | 52 | |
| 0 | 12 ("000001100") | 52 | | 52 | | 26 | 26 | 26 | 26 | 26 |
| 0 | 13 ("000001101") | 52 | | 52 | | 26 | 26 | 26 | 52 | |
| 0 | 14 ("000001110") | 52 | | 52 | | 26 | 52 | | 26 | 26 |
| 0 | 15 ("000001111") | 52 | | 52 | | 26 | 52 | | 52 | |
| 0 | 16~23 ("000010y2y1y0") | 52 | | 52 | | / | 106 | | | |
| 0 | 24~31 ("000011y2y1y0") | 106 | | | | / | 52 | | 52 | |
| 0 | 32~39 ("000100y2y1y0") | 26 | 26 | 26 | 26 | 26 | 106 | | | |
| 0 | 40~47 ("000101y2y1y0") | 26 | 26 | 52 | | 26 | 106 | | | |
| 0 | 48~55 ("000110y2y1y0") | 52 | | 26 | 26 | 26 | 106 | | | |
| 0 | 56~63 ("000111y2y1y0") | 52 | | 52 | | 26 | 106 | | | |
| 0 | 64~71 ("001000y2y1y0") | 106 | | | | 26 | 26 | 26 | 26 | 26 |
| 0 | 72~79 ("001001y2y1y0") | 106 | | | | 26 | 26 | 26 | 52 | |
| 0 | 80~87 ("001010y2y1y0") | 106 | | | | 26 | 26 | 26 | 52 | 26 |
| 0 | 88~95 ("001011y2y1y0") | 106 | | | | 26 | 52 | | 52 | |
| 0 | 96~111 ("001100y1y0z1z0") | 106 | | | | / | 106 | | | |
| 0 | 112 ("001110000") | 52 | | 52 | | / | 52 | | 52 | |
| 0 | 113~127 ("001110001"~"001111111") | reserved | | | | | | | | |
| 0 | 128~191 ("010y2y1y0z2z1z0") | 106 | | | | 26 | 106 | | | |
| 0 | 192~255 ("011000000"~"011111111") | reserved | | | | | | | | |

FIG. 2

300

| RU Allocation subfield | | | | | | | | | | | |
|---|---|---|---|---|---|---|---|---|---|---|---|
| B9 | B8B7....B1B0 | #1 | #2 | #3 | #4 | #5 | #6 | #7 | #8 | #9 | # of Entries |
| 0 | 256 ("100000000") | 26 | 52 + 26 | | | 26 | 26 | 26 | 26 | 26 | 1 |
| 0 | 257 ("100000001") | 26 | 52 + 26 | | | 26 | 26 | 26 | 52 | | 1 |
| 0 | 258 ("100000010") | 26 | 52 + 26 | | | 26 | 52 | | 26 | 26 | 1 |
| 0 | 259 ("100000011") | 26 | 52 + 26 | | | 26 | 52 | | 52 | | 1 |
| 0 | 260 ("100000100") | 26 | 26 | 26 | 26 | 26 | 52 + 26 | | | 26 | 1 |
| 0 | 261 ("100000101") | 52 | | 26 | 26 | 26 | 52 + 26 | | | 26 | 1 |
| 0 | 262 ("100000110") | 26 | 26 | 52 | | 26 | 52 + 26 | | | 26 | 1 |
| 0 | 263 ("100000111") | 52 | | 52 | | 26 | 52 + 26 | | | 26 | 1 |
| 0 | 264 ("100001000") | 26 | 52 + 26 | | | 26 | 52 + 26 | | | 26 | 1 |
| 0 | 265~287 ("100001001"~"100011111") | reserved | | | | | | | | | 22 |
| 0 | 288~295 ("100100y2y1y0") | 26 | 52 + 26 | | | 26 | 106 | | | | 8 |
| 0 | 296~303 ("100101y2y1y0") | 106 | | | | 26 | 52 + 26 | | | 26 | 8 |

FIG. 3A

300

<table>
<tr><td>0</td><td>304~311 ("100110y2y1y0")</td><td colspan="5">106 + 26</td><td>26</td><td>26</td><td>26</td><td>26</td><td>8</td></tr>
<tr><td>0</td><td>312~319 ("100111y2y1y0")</td><td colspan="5">106 + 26</td><td>26</td><td>26</td><td colspan="2">52</td><td>8</td></tr>
<tr><td>0</td><td>320~327 ("101000y2y1y0")</td><td colspan="5">106 + 26</td><td colspan="2">52</td><td>26</td><td>26</td><td>8</td></tr>
<tr><td>0</td><td>328~335 ("101001y2y1y0")</td><td colspan="5">106 + 26</td><td colspan="2">52</td><td colspan="2">52</td><td>8</td></tr>
<tr><td>0</td><td>336~343 ("101010y2y1y0")</td><td>26</td><td>26</td><td>26</td><td>26</td><td colspan="5">106 + 26</td><td>8</td></tr>
<tr><td>0</td><td>344~351 ("101011y2y1y0")</td><td colspan="2">52</td><td>26</td><td>26</td><td colspan="5">106 + 26</td><td>8</td></tr>
<tr><td>0</td><td>352~359 ("101100y2y1y0")</td><td>26</td><td>26</td><td colspan="2">52</td><td colspan="5">106 + 26</td><td>8</td></tr>
<tr><td>0</td><td>360~367 ("101101y2y1y0")</td><td colspan="2">52</td><td colspan="2">52</td><td colspan="5">106 + 26</td><td>8</td></tr>
<tr><td>0</td><td>368~375 ("101110y2y1y0")</td><td>26</td><td colspan="3">52 + 26</td><td colspan="5">106 + 26</td><td>8</td></tr>
<tr><td>0</td><td>376~383 ("101111y2y1y0")</td><td colspan="5">106 + 26</td><td colspan="3">52 + 26</td><td>26</td><td>8</td></tr>
<tr><td>0</td><td>384~447 ("110y2y1y0z2z1z0")</td><td colspan="5">106 + 26</td><td colspan="4">106</td><td>64</td></tr>
<tr><td>0</td><td>448~511 ("111y2y1y0z2z1z0")</td><td colspan="4">106</td><td colspan="5">106 + 26</td><td>64</td></tr>
</table>

FIG. 3B

400

| B9 | B8B7...B1B0 | #1 | #2 | #3 | #4 | #5 | #6 | #7 | #8 | #9 | #10 | #11 | #12 | #13 | #14 | #15 | #16 | Number of Entries |
|---|---|---|---|---|---|---|---|---|---|---|---|---|---|---|---|---|---|---|
| 1 | "00000y3y2y1y0" | 242 | | | | | | | | | | | | | | | | up to 16 |
| 1 | "00001y3y2y1y0" | 484 | | | | | | | | | | | | | | | | up to 16 |
| 1 | "00010y3y2y1y0" | 996 | | | | | | | | | | | | | | | | up to 16 |
| 1 | "00011y3y2y1y0" | 2x996 | | | | | | | | | | | | | | | | up to 16 |
| 1 | "00100y3y2y1y0" | | 242 | 484 | | | | | | | | | | | | | | up to 16 |
| 1 | "00101y3y2y1y0" | 242 | | 484 | | | | | | | | | | | | | | up to 16 |
| 1 | "00110y3y2y1y0" | 484 | | | 242 | | | | | | | | | | | | | up to 16 |
| 1 | "00111y3y2y1y0" | 484 | | 242 | | | | | | | | | | | | | | up to 16 |
| 1 | "01000y3y2y1y0" | | | 484 | | 996 | | | | | | | | | | | | up to 16 |
| 1 | "01001y3y2y1y0" | 484 | | | | 996 | | | | | | | | | | | | up to 16 |
| 1 | "01010y3y2y1y0" | 996 | | | | | | 484 | | | | | | | | | | up to 16 |
| 1 | "01011y3y2y1y0" | 996 | | | | 484 | | | | | | | | | | | | up to 16 |

FIG. 4A

400

| | | | | | | |
|---|---|---|---|---|---|---|
| 1 | "01100y3y2y1y0" | 484 | 996 | 996 | | up to 16 |
| 1 | "01101y3y2y1y0" | 484 | 996 | 996 | | up to 16 |
| 1 | "01110y3y2y1y0" | 996 | 484 | 996 | | up to 16 |
| 1 | "01111y3y2y1y0" | 996 | 484 | 996 | | up to 16 |
| 1 | "10000y3y2y1y0" | 996 | 996 | 484 | | up to 16 |
| 1 | "10001y3y2y1y0" | 996 | 996 | 484 | | up to 16 |
| 1 | "10010y3y2y1y0" | 996 | 996 | 996 | | up to 16 |
| 1 | "10011y3y2y1y0" | 996 | 996 | | 996 | up to 16 |
| 1 | "10100y3y2y1y0" | 996 | | 996 | 996 | up to 16 |
| 1 | "10101y3y2y1y0" | | 996 | 996 | 996 | up to 16 |

FIG. 4B

400

| | | | | | | | | | | | | |
|---|---|---|---|---|---|---|---|---|---|---|---|---|
| 1 | "101100000" | | 242 | 484 | | 996 | | | | | | 1 |
| 1 | "101100001" | 242 | | 484 | | 996 | | | | | | 1 |
| 1 | "101100010" | 484 | | | 242 | 996 | | | | | | 1 |
| 1 | "101100011" | 484 | | 242 | | 996 | | | | | | 1 |
| 1 | "101100100" | 996 | | | | | 242 | 484 | | | | 1 |
| 1 | "101100101" | 996 | | | | 242 | | 484 | | | | 1 |
| 1 | "101100110" | 996 | | | | 484 | | | 242 | | | 1 |
| 1 | "101100111" | 996 | | | | 484 | | 242 | | | | 1 |
| 1 | "101101000" | | | | | 996 | | | | 996 | | 1 |
| 1 | "101101001" | 996 | | | | | | | | 996 | | 1 |
| 1 | "101101010" | 242 (for empty RU with zero user) | | | | | | | | | | 1 |

FIG. 4C

400

| | | | | | | |
|---|---|---|---|---|---|---|
| 1 | "101101011" | 484 (for empty RU with zero user) | | | | 1 |
| 1 | "101101100" | 996 (for empty RU with zero user) | | | | 1 |
| 1 | "101101101"~ "101111111" | reserved | | | | 19 |
| 1 | "11000y3y2y1y0" | 996 | 996 | 996 | 484 | up to 16 |
| 1 | "11001y3y2y1y0" | 996 | 996 | 996 | 484 | up to 16 |
| 1 | "11010y3y2y1y0" | 996 | 996 | 484 | 996 | up to 16 |
| 1 | "11011y3y2y1y0" | 996 | 996 | 484 | 996 | up to 16 |
| 1 | "11100y3y2y1y0" | 996 | 484 | 996 | 996 | up to 16 |
| 1 | "11101y3y2y1y0" | 996 | 484 | 996 | 996 | up to 16 |
| 1 | "11110y3y2y1y0" | 484 | 996 | 996 | 996 | up to 16 |
| 1 | "11111y3y2y1y0" | 484 | 996 | 996 | 996 | up to 16 |

FIG. 4D

500

| B9 | B8B7...B1B0 | #1 | #2 | #3 | #4 | #5 | #6 | #7 | #8 | #9 | #10 | #11 | #12 | #13 | #14 | #15 | #16 | Number of Entries |
|---|---|---|---|---|---|---|---|---|---|---|---|---|---|---|---|---|---|---|
| 1 | "00000y3y2y1y0" | 242 | | | | | | | | | | | | | | | | up to 16 |
| 1 | "00001y3y2y1y0" | 484 | | | | | | | | | | | | | | | | up to 16 |
| 1 | "00010y3y2y1y0" | 996 | | | | | | | | | | | | | | | | up to 16 |
| 1 | "00011y3y2y1y0" | 2x996 | | | | | | | | | | | | | | | | up to 16 |
| 1 | "00100y3y2y1y0" | 996 | | | | 996 | | | | 996 | | | | | | | | up to 16 |
| 1 | "00101y3y2y1y0" | 996 | | | | 996 | | | | | | | | 996 | | | | up to 16 |
| 1 | "00110y3y2y1y0" | 996 | | | | | | | | 996 | | | | 996 | | | | up to 16 |
| 1 | "00111y3y2y1y0" | | | | | 996 | | | | 996 | | | | 996 | | | | up to 16 |
| 1 | "01000y3y2y1y0" | | 242 | 484 | | | | | | | | | | | | | | up to 16 |
| 1 | "01001y3y2y1y0" | 242 | | 484 | | | | | | | | | | | | | | up to 16 |
| 1 | "01010y3y2y1y0" | 484 | | | 242 | | | | | | | | | | | | | up to 16 |
| 1 | "01011y3y2y1y0" | 484 | | 242 | | | | | | | | | | | | | | up to 16 |

FIG. 5A

500

| | | | | | | | | | | | | |
|---|---|---|---|---|---|---|---|---|---|---|---|---|
| 1 | "10110000" | | 242 | 484 | | 996 | | | | | | 1 |
| 1 | "10110001" | 242 | | 484 | | 996 | | | | | | 1 |
| 1 | "10110010" | 484 | | | 242 | 996 | | | | | | 1 |
| 1 | "10110011" | 484 | | 242 | | 996 | | | | | | 1 |
| 1 | "10110100" | 996 | | | | | 242 | 484 | | | | 1 |
| 1 | "10110101" | 996 | | | | 242 | | 484 | | | | 1 |
| 1 | "10110110" | 996 | | | | 484 | | | 242 | | | 1 |
| 1 | "10110111" | 996 | | | | 484 | | 242 | | | | 1 |
| 1 | "10111000" | | | | | 996 | | | | 996 | | 1 |
| 1 | "10111001" | 996 | | | | | | | | 996 | | 1 |
| 1 | "10111010" | 242 (for empty RU with zero user) | | | | | | | | | | 1 |

FIG. 5C

500

| | | | | | | |
|---|---|---|---|---|---|---|
| 1 | "101101011" | 484 (for empty RU with zero user) | | | | 1 |
| 1 | "10110100" | 996 (for empty RU with zero user) | | | | 1 |
| 1 | "10110101"~ "10111111" | reserved | | | | 19 |
| 1 | "11000y3y2y1y0" | 996 | 996 | 996 | 484 | up to 16 |
| 1 | "11001y3y2y1y0" | 996 | 996 | 996 | 484 | up to 16 |
| 1 | "11010y3y2y1y0" | 996 | 996 | 484 | 996 | up to 16 |
| 1 | "11011y3y2y1y0" | 996 | 996 | 484 | 996 | up to 16 |
| 1 | "11100y3y2y1y0" | 996 | 484 | 996 | 996 | up to 16 |
| 1 | "11101y3y2y1y0" | 996 | 484 | 996 | 996 | up to 16 |
| 1 | "11110y3y2y1y0" | 484 | 996 | 996 | 996 | up to 16 |
| 1 | "11111y3y2y1y0" | 484 | 996 | 996 | 996 | up to 16 |

FIG. 5D

Assuming EHT-SIG in per-80 Structure:

| | Common Field | | User-Specific Field |
|---|---|---|---|
| CC1 | "10"b7b6b5b4b3b2b1b0 | "00"01110011 | User Field for CC1 |
| CC2 | "10"b7b6b5b4b3b2'b1'b0' | "00"01110011 | User Field for CC2 |
| CC1 | "10"b7b6b5b4b3b2b1b0 | "00"01110011 | User Field for CC1 |
| CC2 | "10"b7b6b5b4b3b2'b1'b0' | "00"01110011 | User Field for CC2 |
| CC3 | "01"x7x6x5x4x3x2x1x0 | "00"01110010 | User Field for CC3 |
| CC4 | "00"y7y6y5y4y3y2y1y0 | "00"01110010 | User Field for CC4 |
| CC3 | "01"x7x6x5x4x3x2x1x0 | "00"01110010 | User Field for CC3 |
| CC4 | "00"y7y6y5y4y3y2y1y0 | "00"01110010 | User Field for CC4 |

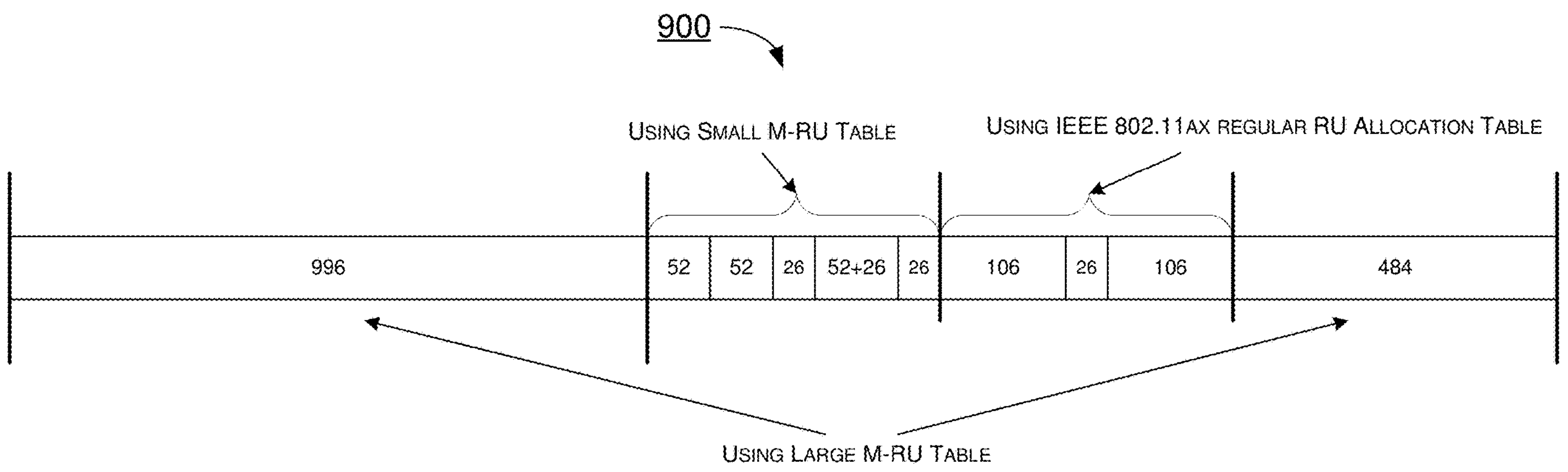

ASSUMING EHT-SIG IN PER-160 STRUCTURE:

| | COMMON FIELD | | | | USER-SPECIFIC FIELD |
|---|---|---|---|---|---|
| CC1 | "10"b7b6b5b4b3b2b1b0 | "00"01110011 | "01"x7x6x5x4x3x2x1x0 | "00"01110010 | ALL USER FIELDS SCHEDULED IN CC1 |
| CC2 | "10"b7b6b5b4b3b2'b1'b0' | "00"01110011 | "00"y7y6y5y4y3y2y1y0 | "00"01110010 | ALL USER FIELDS SCHEDULED IN CC2 |
| CC1 | "10"b7b6b5b4b3b2b1b0 | "00"01110011 | "01"x7x6x5x4x3x2x1x0 | "00"01110010 | ALL USER FIELDS SCHEDULED IN CC1 |
| CC2 | "10"b7b6b5b4b3b2'b1'b0' | "00"01110011 | "00"y7y6y5y4y3y2y1y0 | "00"01110010 | ALL USER FIELDS SCHEDULED IN CC2 |
| CC1 | "10"b7b6b5b4b3b2b1b0 | "00"01110011 | "01"x7x6x5x4x3x2x1x0 | "00"01110010 | ALL USER FIELDS SCHEDULED IN CC1 |
| CC2 | "10"b7b6b5b4b3b2'b1'b0' | "00"01110011 | "00"y7y6y5y4y3y2y1y0 | "00"01110010 | ALL USER FIELDS SCHEDULED IN CC2 |
| CC1 | "10"b7b6b5b4b3b2b1b0 | "00"01110011 | "01"x7x6x5x4x3x2x1x0 | "00"01110010 | ALL USER FIELDS SCHEDULED IN CC1 |
| CC2 | "10"b7b6b5b4b3b2'b1'b0' | "00"01110011 | "00"y7y6y5y4y3y2y1y0 | "00"01110010 | ALL USER FIELDS SCHEDULED IN CC2 |

FIG. 9

1200

"0000" FOR SMALL-RU, NO MU-MIMO → "0000x3x2x1x0" (rows 0–15)

"0001" FOR SMALL-RU, NO MU-MIMO → "0001x3x2x1x0" (rows 16–31)

| B7...B1B0 | #1 | #2 | #3 | #4 | #5 | #6 | #7 | #8 | #9 | # of Entries |
|---|---|---|---|---|---|---|---|---|---|---|
| 0 ("00000000") | 26 | 26 | 26 | 26 | 26 | 26 | 26 | 26 | 26 | 1 |
| 1 ("00000001") | 26 | 26 | 26 | 26 | 26 | 26 | 26 | 52 | | 1 |
| 2("00000010") | 26 | 26 | 26 | 26 | 26 | 52 | | 26 | 26 | 1 |
| 3 ("00000011") | 26 | 26 | 26 | 26 | 26 | 52 | | 52 | | 1 |
| 4 ("00000100") | 26 | 26 | 52 | | 26 | 26 | 26 | 26 | 26 | 1 |
| 5 ("00000101") | 26 | 26 | 52 | | 26 | 26 | 26 | 52 | | 1 |
| 6 ("00000110") | 26 | 26 | 52 | | 26 | 52 | | 26 | 26 | 1 |
| 7 ("00000111") | 26 | 26 | 52 | | 26 | 52 | | 52 | | 1 |
| 8 ("00001000") | 52 | | 26 | 26 | 26 | 26 | 26 | 26 | 26 | 1 |
| 9 ("00001001") | 52 | | 26 | 26 | 26 | 26 | 26 | 52 | | 1 |
| 10 ("00001010") | 52 | | 26 | 26 | 26 | 52 | | 26 | 26 | 1 |
| 11 ("00001011") | 52 | | 26 | 26 | 26 | 52 | | 52 | | 1 |
| 12 ("00001100") | 52 | | 52 | | 26 | 26 | 26 | 26 | 26 | 1 |
| 13 ("00001101") | 52 | | 52 | | 26 | 26 | 26 | 52 | | 1 |
| 14 ("00001110") | 52 | | 52 | | 26 | 52 | | 26 | 26 | 1 |
| 15 ("00001111") | 52 | | 52 | | 26 | 52 | | 52 | | 1 |
| 16 ("00010000") | 52 | | 52 | | / | 106 | | | | 1 |
| 17 ("00010001") | 106 | | | | / | 52 | | 52 | | 1 |
| 18("00010010") | 26 | 26 | 26 | 26 | 26 | 106 | | | | 1 |
| 19 ("00010011") | 26 | 26 | 52 | | 26 | 106 | | | | 1 |
| 20 ("00010100") | 52 | | 26 | 26 | 26 | 106 | | | | 1 |
| 21 ("00010101") | 52 | | 52 | | 26 | 106 | | | | 1 |
| 22 ("00010110") | 106 | | | | 26 | 26 | 26 | 26 | 26 | 1 |
| 23 ("00010111") | 106 | | | | 26 | 26 | 26 | 52 | | 1 |
| 24 ("00011000") | 106 | | | | 26 | 26 | 26 | 52 | 26 | 1 |
| 25 ("00011001") | 106 | | | | 26 | 52 | | 52 | | 1 |
| 26 ("00011010") | 106 | | | | / | 106 | | | | 1 |
| 27 ("00011011") | 106 | | | | 26 | 106 | | | | 1 |
| 28~31 | reserved | | | | | | | | | 4 |

FIG. 12

1300

"0010" FOR SMALL-RU, NO MU-MIMO → "0010x3x2x1x0" (entries 32–47)

"0011" FOR SMALL-RU, NO MU-MIMO → "0011x3x2x1x0" (entries 48–63)

| B7...B1B0 | #1 | #2 | #3 | #4 | #5 | #6 | #7 | #8 | #9 | # of Entries |
|---|---|---|---|---|---|---|---|---|---|---|
| 32 ("00100000") | 26 | 52 + 26 | | | 26 | 26 | 26 | 26 | 26 | 1 |
| 33 ("00100001") | 26 | 52 + 26 | | | 26 | 26 | 26 | 52 | | 1 |
| 34("00100010") | 26 | 52 + 26 | | | 26 | 52 | | 26 | 26 | 1 |
| 35 ("00100011") | 26 | 52 + 26 | | | 26 | 52 | | 52 | | 1 |
| 36 ("00100100") | 26 | 26 | 26 | 26 | 26 | 52 + 26 | | | 26 | 1 |
| 37 ("00100101") | 52 | | 26 | 26 | 26 | 52 + 26 | | | 26 | 1 |
| 38 ("00100110") | 26 | 26 | 52 | | 26 | 52 + 26 | | | 26 | 1 |
| 39 ("00100111") | 52 | | 52 | | 26 | 52 + 26 | | | 26 | 1 |
| 40 ("00101000") | 26 | 52 + 26 | | | 26 | 52 + 26 | | | 26 | 1 |
| 41 ("00101001") | 26 | 52 + 26 | | | 26 | 106 | | | | 1 |
| 42 ("00101010") | 106 | | | | 26 | 52 + 26 | | | 26 | 1 |
| 43~47 | reserved | | | | | | | | | 5 |
| 48 ("00110000") | 106 + 26 | | | | | 26 | 26 | 26 | 26 | 1 |
| 49 ("00110001") | 106 + 26 | | | | | 26 | 26 | 52 | | 1 |
| 50("00110010") | 106 + 26 | | | | | 52 | | 26 | 26 | 1 |
| 51 ("00110011") | 106 + 26 | | | | | 52 | | 52 | | 1 |
| 52 ("00110100") | 26 | 26 | 26 | 26 | 106 + 26 | | | | | 1 |
| 53 ("00110101") | 52 | | 26 | 26 | 106 + 26 | | | | | 1 |
| 54 ("00110110") | 26 | 26 | 52 | | 106 + 26 | | | | | 1 |
| 55 ("00110111") | 52 | | 52 | | 106 + 26 | | | | | 1 |
| 56 ("00111000") | 26 | 52 + 26 | | | 106 + 26 | | | | | 1 |
| 57 ("00111001") | 106 + 26 | | | | | 52 + 26 | | | 26 | 1 |
| 58 ("00111010") | 106 + 26 | | | | | 106 | | | | 1 |
| 59 ("00111011") | 106 | | | | 106 + 26 | | | | | 1 |
| 60 ("00111100") | 242-tone RU empty (with zero users) | | | | | | | | | 1 |
| 61 ("00111101") | 484-tone RU empty (with zero users) | | | | | | | | | 1 |
| 62 ("00111110") | 996-tone RU empty (with zero users) | | | | | | | | | 1 |
| 63 ("00111111") | 2x996-tone RU empty (with zero users) | | | | | | | | | 1 |

FIG. 13

1400

| | | |
|---|---|---|
| 64~71 ("01000y2y1y0") | RU242 | 8 |
| 72~79 ("01001y2y1y0") | RU484 | 8 |
| 80~87 ("01010y2y1y0") | RU996 | 8 |
| 88~95 ("01011y2y1y0") | RU2x996 | 8 |
| 96~127 ("011z1z0y2y1y0") | M-RU (242+484) | 32 |
| 128~159 ("100z1z0y2y1y0") | M-RU (484+996) | 32 |
| 160~191 ("101z1z0y2y1y0") | M-RU (3x996) | 32 |
| 192~255 ("11z2z1z0y2y1y0") | M-RU (484+3x996) or (484+2x996) (TBD for OFDMA) | 64 |

NOTE-1: y2y1y0=000-111 indicates the number of users;

NOTE-2: z1z0=00-11 or z2z1z0=000~111 indicates M-RU combination index;

NOTE-3: since M-RU (484+2x996) and M-RU (484+3x996) can never be co-exist, thus entries of 192~255 ("11x2x1x0y2y1y0") will be shared for the signaling of M-RU (484+2x996) and M-RU (484+3x996). Based on BW, it will be clear which M-RU will be signaled.

NOTE-4: if not supporting M-RU(484+2x996) and M-RU(484+3x996) for OFDMA, then entries 192~255 will become reserved bits or used for others

FIG. 14

1700

SAME AS IEEE 802.11AX

| B7...B1B0 | #1 | #2 | #3 | #4 | #5 | #6 | #7 | #8 | #9 | # of Entries |
|---|---|---|---|---|---|---|---|---|---|---|
| 0 ("00000000") | 26 | 26 | 26 | 26 | 26 | 26 | 26 | 26 | 26 | 1 |
| 1 ("00000001") | 26 | 26 | 26 | 26 | 26 | 26 | 26 | 52 | | 1 |
| 2 ("00000010") | 26 | 26 | 26 | 26 | 26 | 52 | | 26 | 26 | 1 |
| 3 ("00000011") | 26 | 26 | 26 | 26 | 26 | 52 | | 52 | | 1 |
| 4 ("00000100") | 26 | 26 | 52 | | 26 | 26 | 26 | 26 | 26 | 1 |
| 5 ("00000101") | 26 | 26 | 52 | | 26 | 26 | 26 | 52 | | 1 |
| 6 ("00000110") | 26 | 26 | 52 | | 26 | 52 | | 26 | 26 | 1 |
| 7 ("00000111") | 26 | 26 | 52 | | 26 | 52 | | 52 | | 1 |
| 8 ("00001000") | 52 | | 26 | 26 | 26 | 26 | 26 | 26 | 26 | 1 |
| 9 ("00001001") | 52 | | 26 | 26 | 26 | 26 | 26 | 52 | | 1 |
| 10 ("00001010") | 52 | | 26 | 26 | 26 | 52 | | 26 | 26 | 1 |
| 11 ("00001011") | 52 | | 26 | 26 | 26 | 52 | | 52 | | 1 |
| 12 ("00001100") | 52 | | 52 | | 26 | 26 | 26 | 26 | 26 | 1 |
| 13 ("00001101") | 52 | | 52 | | 26 | 26 | 26 | 52 | | 1 |
| 14 ("00001110") | 52 | | 52 | | 26 | 52 | | 26 | 26 | 1 |
| 15 ("00001111") | 52 | | 52 | | 26 | 52 | | 52 | | 1 |
| 16 ("00010000") | 52 | | 52 | | / | 106 | | | | 1 |
| 17 ("00010001") | 106 | | | | / | 52 | | 52 | | 1 |
| 18("00010010") | 26 | 26 | 26 | 26 | 26 | 106 | | | | 1 |
| 19 ("00010011") | 26 | 26 | 52 | | 26 | 106 | | | | 1 |
| 20 ("00010100") | 52 | | 26 | 26 | 26 | 106 | | | | 1 |
| 21 ("00010101") | 52 | | 52 | | 26 | 106 | | | | 1 |
| 22 ("00010110") | 106 | | | | 26 | 26 | 26 | 26 | 26 | 1 |
| 23 ("00010111") | 106 | | | | 26 | 26 | 26 | 52 | | 1 |
| 24 ("00011000") | 106 | | | | 26 | 26 | 26 | 52 | 26 | 1 |
| 25 ("00011001") | 106 | | | | 26 | 52 | | 52 | | 1 |
| 26 ("00011010") | 106 | | | | / | 106 | | | | 1 |
| 27 ("00011011") | 106 | | | | 26 | 106 | | | | 1 |
| 28 ("00111100") | 242-tone RU empty (with zero users) | | | | | | | | | 1 |
| 29 ("00111101") | 484-tone RU empty (with zero users) | | | | | | | | | 1 |
| 30 ("00111110") | 996-tone RU empty (with zero users) | | | | | | | | | 1 |
| 31 ("00111111") | 2x996-tone RU empty (with zero users) | | | | | | | | | 1 |
| 32~39 ("01000y2y1y0") | RU242 | | | | | | | | | 8 |
| 40~47 ("01001y2y1y0") | RU484 | | | | | | | | | 8 |
| 48~55 ("01010y2y1y0") | RU996 | | | | | | | | | 8 |
| 56~63 ("01011y2y1y0") | RU2x996 | | | | | | | | | 8 |
| 65~127 ("01100000-01111111) | reserved | | | | | | | | | 64 |

RESERVED ENTRIES POTENTIALLY USED FOR OTHER RU ALLOCATION PATTERNS

FIG. 17

1800

SMALL M-RU ALLOCATION COMBINATIONS (128–155)

LARGE RU/M-RU (160~191 – 224~255)

| | | | | | | | | | | |
|---|---|---|---|---|---|---|---|---|---|---|
| 128 ("10000000") | 26 | 78 (26+52) | | | 26 | 26 | 26 | 26 | 26 | 1 |
| 129 ("10000001") | 26 | 78 (26+52) | | | 26 | 26 | 26 | 52 | | 1 |
| 130 ("10000010") | 26 | 78 (26+52) | | | 26 | 52 | | 26 | 26 | 1 |
| 131 ("10000011") | 26 | 78 (26+52) | | | 26 | 52 | | 52 | | 1 |
| 132 ("10000100") | 26 | 26 | 26 | 26 | 26 | 78 (26+52) | | | 26 | 1 |
| 133 ("10000101") | 52 | | 26 | 26 | 26 | 78 (26+52) | | | 26 | 1 |
| 134 ("10000110") | 26 | 26 | 52 | | 26 | 78 (26+52) | | | 26 | 1 |
| 135 ("10000111") | 52 | | 52 | | 26 | 78 (26+52) | | | 26 | 1 |
| 136 ("10001000") | 26 | 78 (26+52) | | | 26 | 78 (26+52) | | | 26 | 1 |
| 137 ("10001001") | 26 | 78 (26+52) | | | 26 | 106 | | | | 1 |
| 138 ("10001010") | 106 | | | | 26 | 78 (26+52) | | | 26 | 1 |
| 139~143 ('10001011-10001111) | reserved | | | | | | | | | 5 |
| 144 ("10010000") | 132 (26+106) | | | | | 26 | 26 | 26 | 26 | 1 |
| 145 ("10010001") | 132 (26+106) | | | | | 26 | 26 | 52 | | 1 |
| 146 ("10010010") | 132 (26+106) | | | | | 52 | | 26 | 26 | 1 |
| 147 ("10010011") | 132 (26+106) | | | | | 52 | | 52 | | 1 |
| 148 ("10010100") | 26 | 26 | 26 | 26 | 132 (26+106) | | | | | 1 |
| 149 ("10010101") | 52 | | 26 | 26 | 132 (26+106) | | | | | 1 |
| 150 ("10010110") | 26 | 26 | 52 | | 132 (26+106) | | | | | 1 |
| 151 ("10010111") | 52 | | 52 | | 132 (26+106) | | | | | 1 |
| 152 ("10011000") | 26 | 78 (26+52) | | | 132 (26+106) | | | | | 1 |
| 153 ("10011001") | 132 (26+106) | | | | | 78 (26+52) | | | 26 | 1 |
| 154 ("10011010") | 132 (26+106) | | | | | 106 | | | | 1 |
| 155 ("10011011") | 106 | | | | 132 (26+106) | | | | | 1 |
| 156~159 ('10011000-10011111) | reserved | | | | | | | | | 4 |
| 160~191 ("101z1z0y2y1y0") | M-RU (242+484) | | | | | | | | | 32 |
| 192~223 ("110z1z0y2y1y0") | M-RU (484+996) | | | | | | | | | 32 |
| 224~255 ("111z1z0y2y1y0") | M-RU (3x996) | | | | | | | | | 32 |

NOTE-1: y2y1y0 = 000~111 indicates the number of users; Nuser = 2^2 × y2 + 2^1 × y1 + y0 + 1 users multiplexed in the RU or M-RU

NOTE-2: z1z0=00-11 indicates M-RU combination index for a given M-RU size of (242+484)/(484+996)/(3x996)

FIG. 18

1900

| | | | | | | | | | |
|---|---|---|---|---|---|---|---|---|---|
| 128 ("10000000") | 26 | 78 (26+52) | | | 26 | 26 | 26 | 26 | 26 | 1 |
| 129 ("10000001") | 26 | 78 (26+52) | | | 26 | 26 | 26 | 52 | | 1 |
| 130 ("10000010") | 26 | 78 (26+52) | | | 26 | 52 | | 26 | 26 | 1 |
| 131 ("10000011") | 26 | 78 (26+52) | | | 26 | 52 | | 52 | | 1 |
| 132 ("10000100") | 26 | 26 | 26 | 26 | 26 | 78 (26+52) | | | 26 | 1 |
| 133 ("10000101") | 52 | | 26 | 26 | 26 | 78 (26+52) | | | 26 | 1 |
| 134 ("10000110") | 26 | 26 | 52 | | 26 | 78 (26+52) | | | 26 | 1 |
| 135 ("10000111") | 52 | | 52 | | 26 | 78 (26+52) | | | 26 | 1 |
| 136 ("10001000") | 26 | 78 (26+52) | | | 26 | 78 (26+52) | | | 26 | 1 |
| 137 ("10001001") | 26 | 78 (26+52) | | | 26 | 106 | | | | 1 |
| 138 ("10001010") | 106 | | | | 26 | 78 (26+52) | | | 26 | 1 |
| 139 ("10001011") | / | 78 (26+52) | | | 26 | 78 (26+52) | | | / | 1 |
| 140 ("10001100") | / | 78 (26+52) | | | 26 | 106 | | | | 1 |
| 141 ("10001101") | 106 | | | | 26 | 78 (26+52) | | | / | 1 |
| 142 ("10001110") | / | 78 (26+52) | | | / | 106 | | | | 1 |
| 143 ("10001111") | 106 | | | | / | 78 (26+52) | | | / | 1 |
| 144 ("10010000") | 132 (26+106) | | | | | 26 | 26 | 26 | 26 | 1 |
| 145 ("10010001") | 132 (26+106) | | | | | 26 | 26 | 52 | | 1 |
| 146 ("10010010") | 132 (26+106) | | | | | 52 | | 26 | 26 | 1 |
| 147 ("10010011") | 132 (26+106) | | | | | 52 | | 52 | | 1 |

ASSUMING SOME EDGE RU26 OR "CENTER RU26" IS NOT ASSIGNED TO ANY USER (rows 139–143)

FIG. 19A

1900

| | | | | | | | | |
|---|---|---|---|---|---|---|---|---|
| 148 ("10010100") | 26 | 26 | 26 | 26 | 132 (26+106) | | | 1 |
| 149 ("10010101") | 52 | | 26 | 26 | 132 (26+106) | | | 1 |
| 150 ("10010110") | 26 | 26 | 52 | | 132 (26+106) | | | 1 |
| 151 ("10010111") | 52 | | 52 | | 132 (26+106) | | | 1 |
| 152 ("10011000") | 26 | 78 (26+52) | | | 132 (26+106) | | | 1 |
| 153 ("10011001") | 132 (26+106) | | | | | 78 (26+52) | 26 | 1 |
| 154 ("10011010") | 132 (26+106) | | | | | 106 | | 1 |
| 155 ("10011011") | 106 | | | | 132 (26+106) | | | 1 |
| 156 ("10011100") | / | 78 (26+52) | | | 132 (26+106) | | | 1 |
| 157 ("10011101") | 132 (26+106) | | | | | 78 (26+52) | / | 1 |
| 158~159 ("10011110-10011111) | reserved | | | | | | | 2 |
| 160~191 ("101z1z0y2y1y0") | M-RU (242+484) | | | | | | | 32 |
| 192~223 ("110z1z0y2y1y0") | M-RU (484+996) | | | | | | | 32 |
| 224~255 ("111z1z0y2y1y0") | M-RU (3x996) | | | | | | | 32 |

NOTE-1: y2y1y0 = 000~111 indicates the number of users; Nuser=2^2xy2+2^1xy1+y0+1 users multiplexed in the RU or M-RU

NOTE-2: z1z0=00-11 indicates M-RU combination index for a given M-RU size of (242+484)/(484+996)/(3x996)

ASSUMING SOME EDGE RU26 OR "CENTER RU26" IS NOT ASSIGNED TO ANY USER

FIG. 19B

ENHANCED RESOURCE UNIT ALLOCATION SUBFIELD DESIGN FOR EXTREME HIGH-THROUGHPUT SYSTEMS

CROSS REFERENCE TO RELATED PATENT APPLICATION

The present disclosure is part of a non-provisional patent application claiming the priority benefit of U.S. Provisional Patent Application Nos. 62/984,347, 62/992,231, 63/026,757 and 63/030,332, filed 3 Mar. 2020, 20 Mar. 2020, 19 May 2020 and 27 May 2020, respectively, the contents of which being incorporated by reference in their entirety.

TECHNICAL FIELD

The present disclosure is generally related to wireless communications and, more particularly, to enhanced resource unit (RU) allocation subfield design for extreme high-throughput (EHT) systems.

BACKGROUND

Unless otherwise indicated herein, approaches described in this section are not prior art to the claims listed below and are not admitted as prior art by inclusion in this section.

In next-generation EHT systems such as wireless local area network (WLAN) systems in accordance with the upcoming Institute of Electrical and Electronics Engineers (IEEE) 802.11be standard, multiple RUs can be allocated to a single station (STA) so that transmission on the multiple RUs (or multi-RU transmission) to the single STA is permissible. Multi-RU transmission can be operated for both orthogonal frequency division multiple access (OFDMA) scenarios as well as non-OFDMA (e.g., single-user (SU) or multi-user (MU) multiple-input-multiple-output (MIMO)) scenarios. To relax implementation complexity, not all but only a limited number of multi-RU combinations are allowed. Specifically, an existing RU/multi-RU allocation table (or subfield) may be extended or expanded to support more RU combination cases and support a larger number of users for MU-MIMO in IEEE 802.11 be as well as future WiFi technologies. Therefore, there is a need for a solution of new indexing and signaling of the new multi-RU allocations.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to provide schemes, concepts, designs, techniques, methods and apparatuses pertaining to enhanced RU allocation subfield design for EHT systems. Under various proposed schemes in accordance with the present disclosure, an RU allocation subfield defined in IEEE 802.11ax may be extended with one or two bits or otherwise enhanced for IEEE 802.11be to support multi-RU (MRU) signaling through RU allocation subfield. This extended or enhanced RU Allocation subfield/or Table may indicate which RU allocation subfield is to be used for small multi-RU scheduling, large multi-RU scheduling or regular single RU scheduling. The proposed schemes may be flexible and simple to use, and may be backward compatible with the IEEE 802.11ax design.

In one aspect, a method pertaining to enhanced RU allocation subfield design for EHT systems may involve determining one or more RUs based on an RU allocation table, which may include at least a combination of a plurality of aggregations of multiple RUs. The method may also involve performing wireless communications using the one or more RUs.

In another aspect, a method pertaining to enhanced RU allocation subfield design for EHT systems may involve selecting one or more RUs from an RU allocation table, which may include at least a combination of a plurality of aggregations of multiple RUs. The method may also involve transmitting a signal to one or more STAs to indicate the one or more RUs. The method may further involve performing wireless communications with the one or more STAs using the one or more RUs.

In yet another aspect, a method pertaining to enhanced RU allocation subfield design for EHT systems may involve receiving a signal that indicates one or more RUs. The method may also involve selecting the one or more RUs from an RU allocation table, which may include at least a combination of a plurality of aggregations of multiple RUs, responsive to receiving the signal. The method may further involve performing wireless communications with one or more STAs using the one or more RUs.

It is noteworthy that, although description provided herein may be in the context of certain radio access technologies, networks and network topologies such as, Wi-Fi, the proposed concepts, schemes and any variation(s)/derivative(s) thereof may be implemented in, for and by other types of radio access technologies, networks and network topologies such as, for example and without limitation, Bluetooth, ZigBee, 5th Generation (5G)/New Radio (NR), Long-Term Evolution (LTE), LTE-Advanced, LTE-Advanced Pro, Internet-of-Things (IoT), Industrial IoT (IIoT) and narrowband IoT (NB-IoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation to clearly illustrate the concept of the present disclosure.

FIG. 2 is a diagram of an example subfield design for small RUs in accordance with the present disclosure.

Each of FIG. 3A and FIG. 3B is a diagram of another example subfield design for small RUs and small MRUs in accordance with the present disclosure.

Each of FIG. 4A~4D is a diagram of a respective portion of an example subfield design for large RUs and large MRUs in accordance with the present disclosure.

Each of FIG. 5A~5D is a diagram of a respective portion of an example subfield design for large RUs and large MRUs in accordance with the present disclosure.

Figure 6:
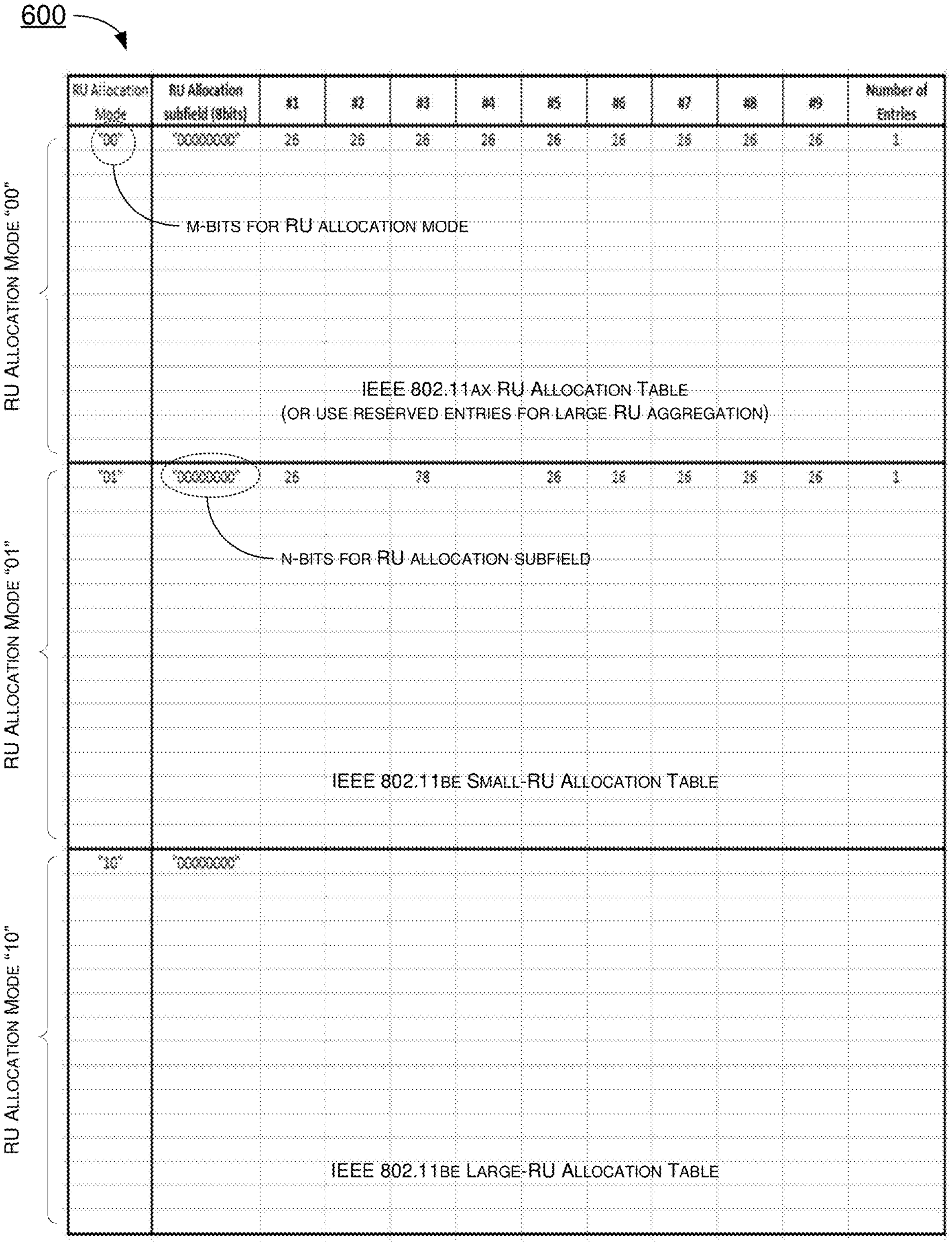

FIG. 6 is a diagram of an example design of an overall RU allocation subfield in accordance with the present disclosure.

Figure 7:
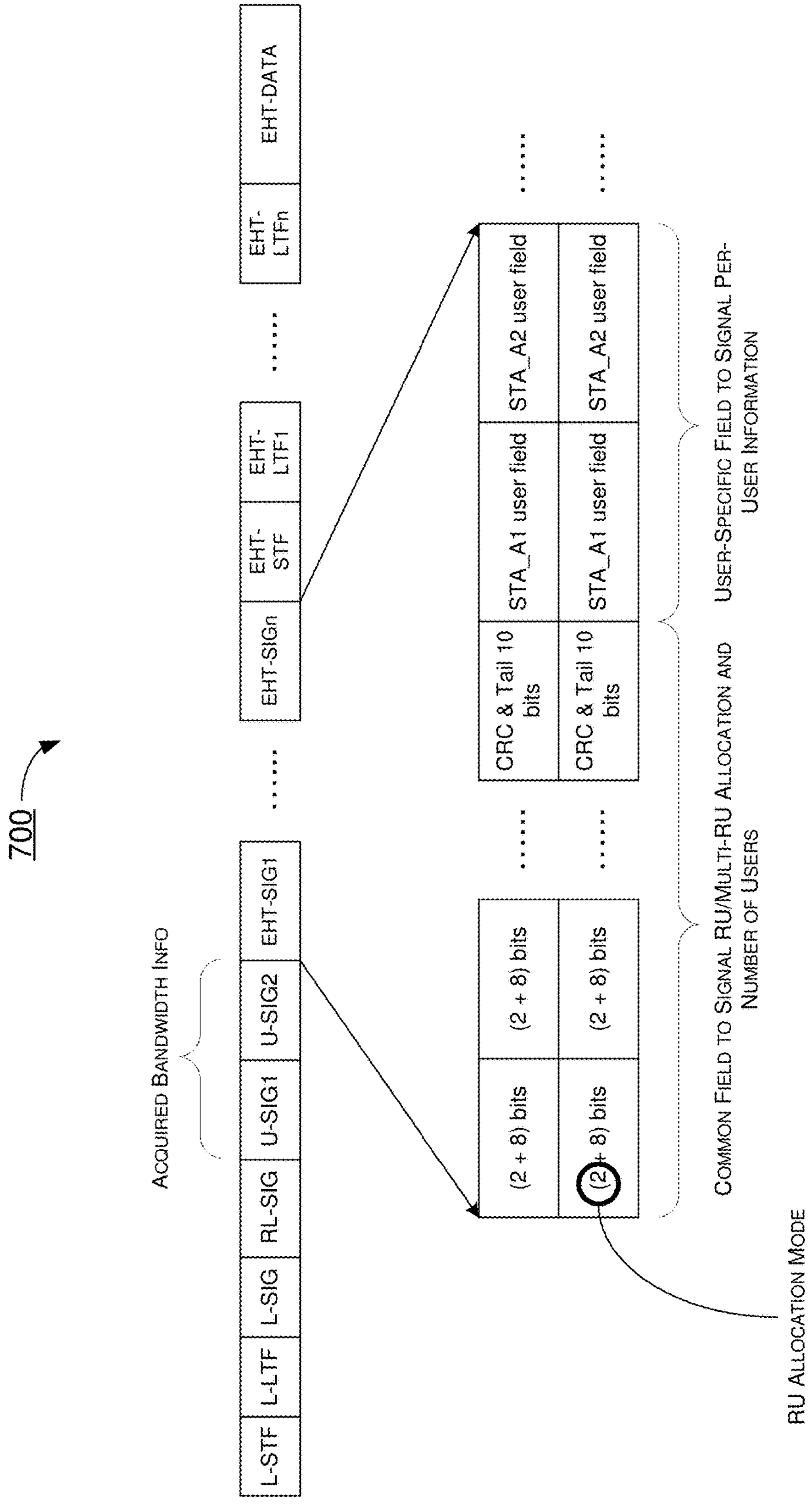

FIG. 7 is a diagram of an example design in accordance with the present disclosure.

Figure 8:
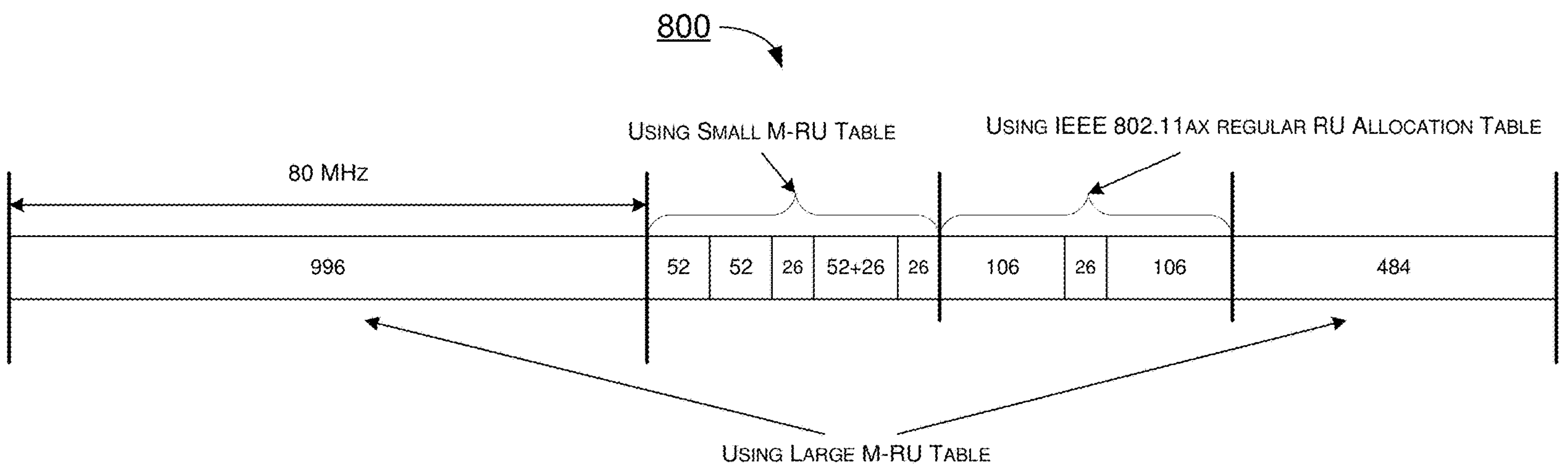

FIG. 8 is a diagram of an example design in accordance with the present disclosure.

FIG. 9 is a diagram of an example design in accordance with the present disclosure.

Figure 10:
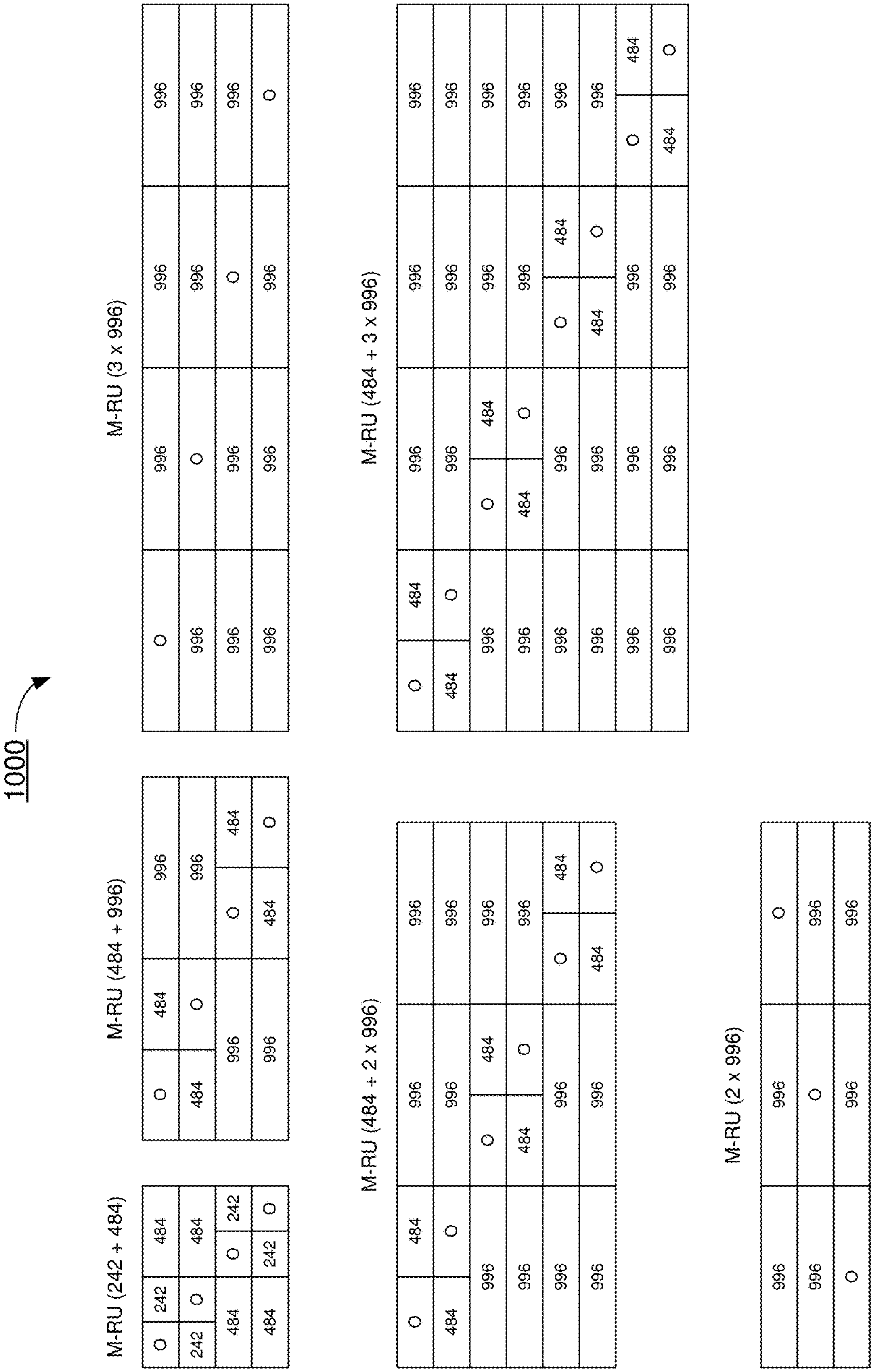

FIG. 10 is a diagram of an example design in accordance with the present disclosure.

Figure 11A:
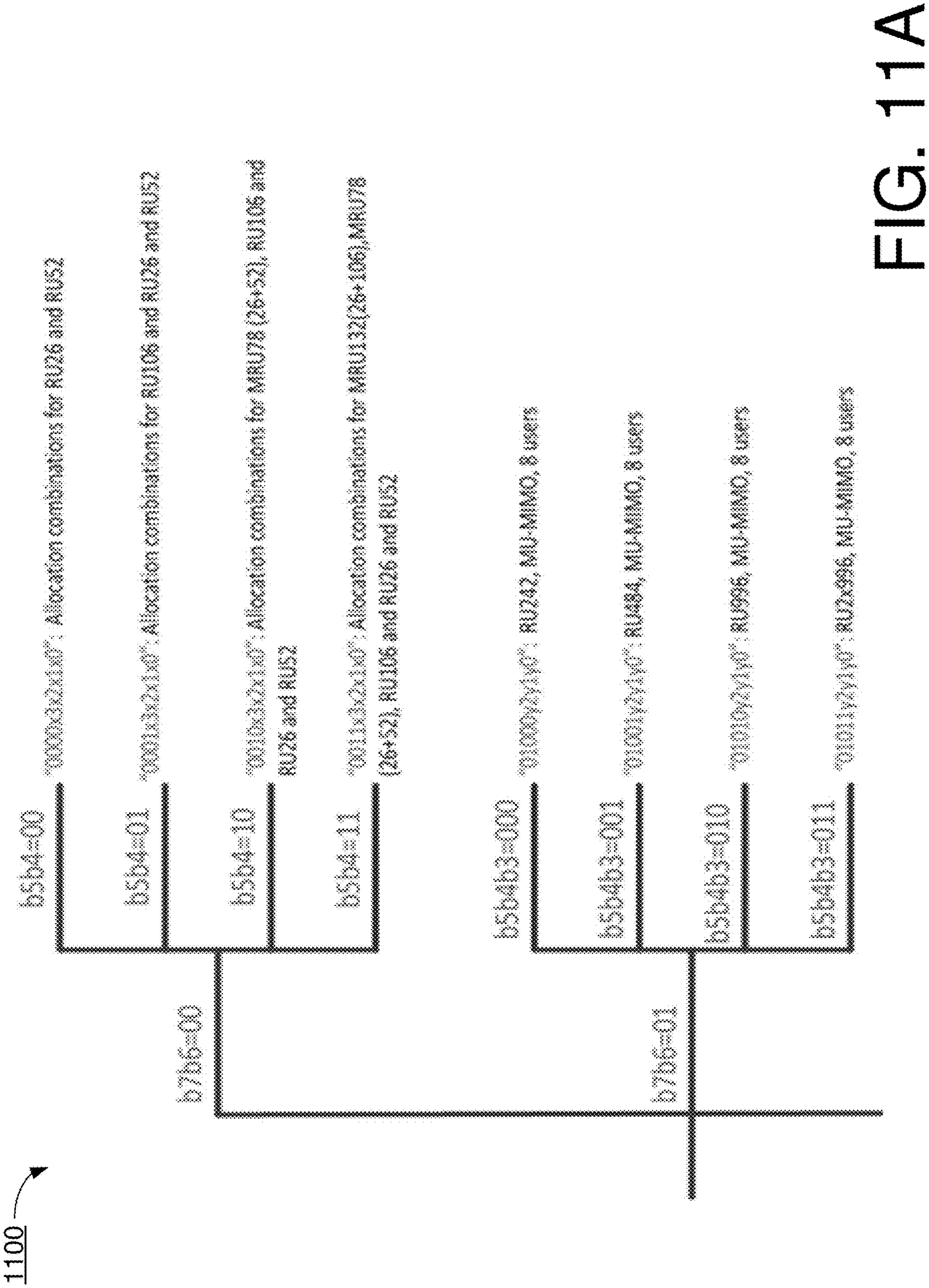
Figure 11B:
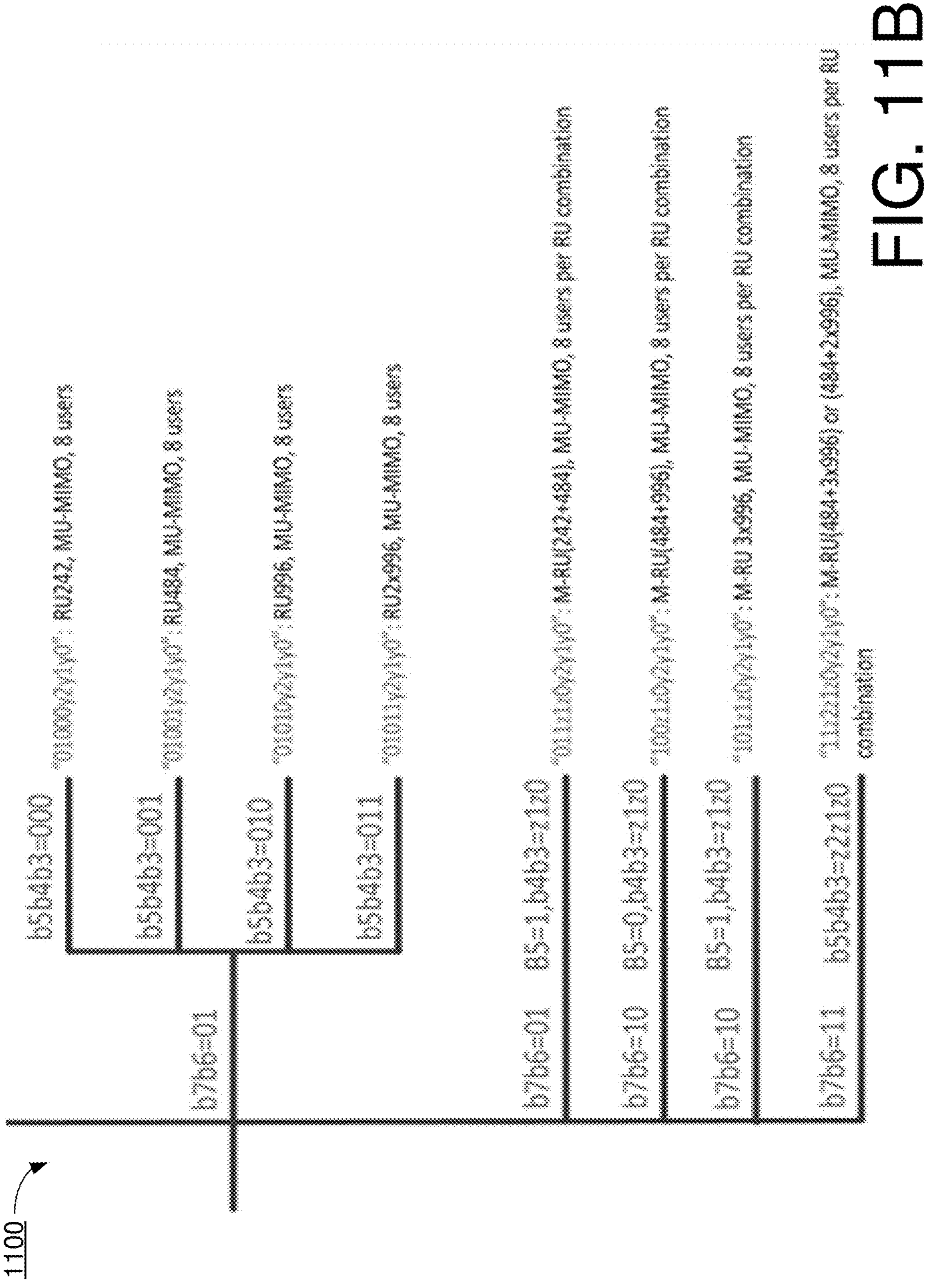

Each of FIG. 11A and FIG. 11B is a diagram of an example design in accordance with the present disclosure.

FIG. 12 is a diagram of an example design in accordance with the present disclosure.

FIG. 13 is a diagram of an example design in accordance with the present disclosure.

FIG. 14 is a diagram of an example design in accordance with the present disclosure.

Figure 15:
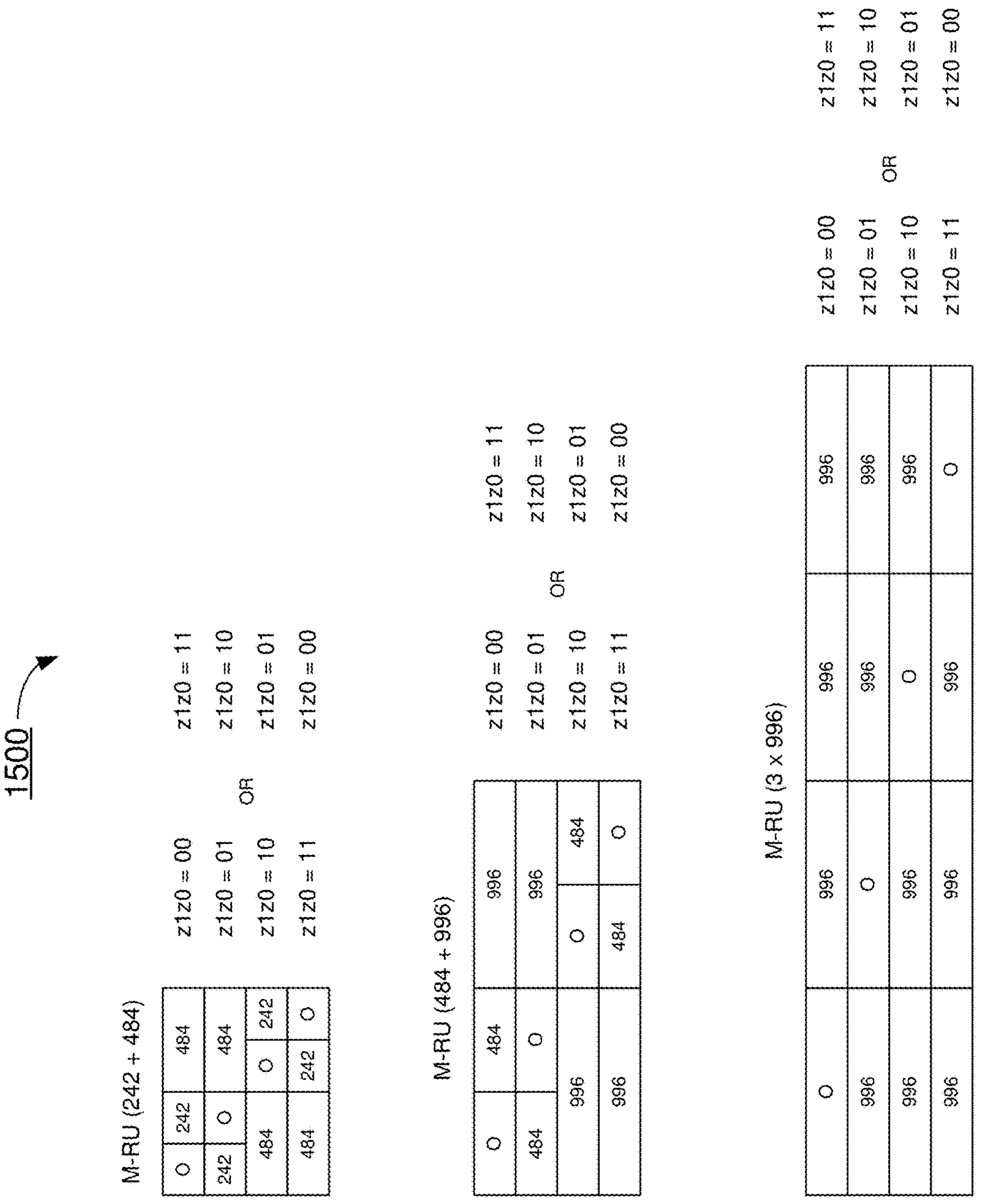

FIG. 15 is a diagram of an example design in accordance with the present disclosure.

Figure 16:
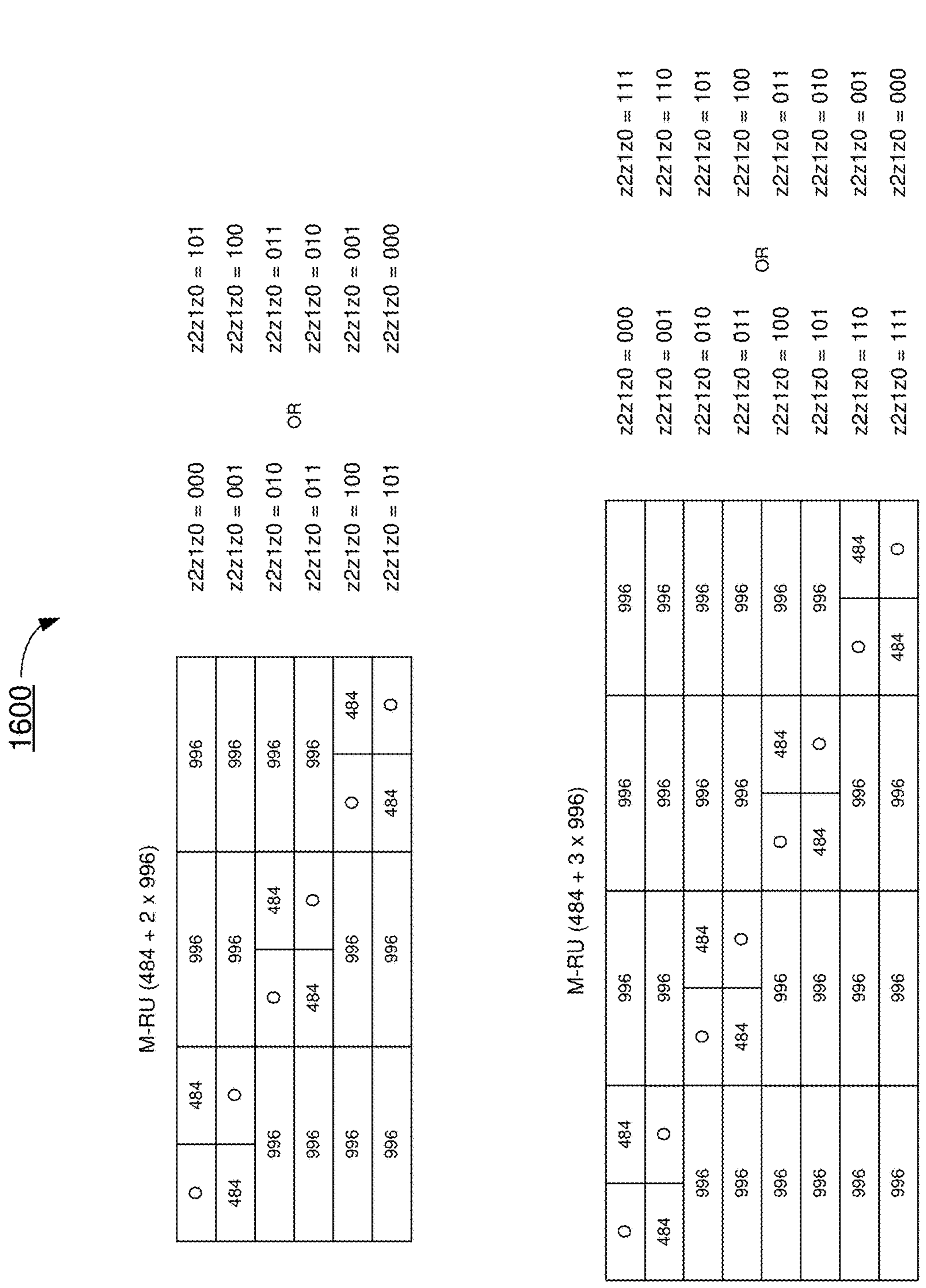

FIG. 16 is a diagram of an example design in accordance with the present disclosure.

FIG. 17 is a diagram of an example design in accordance with the present disclosure.

FIG. 18 is a diagram of an example design in accordance with the present disclosure.

Each of FIG. 19A and FIG. 19B is a diagram of an example design in accordance with the present disclosure.

Figure 20:
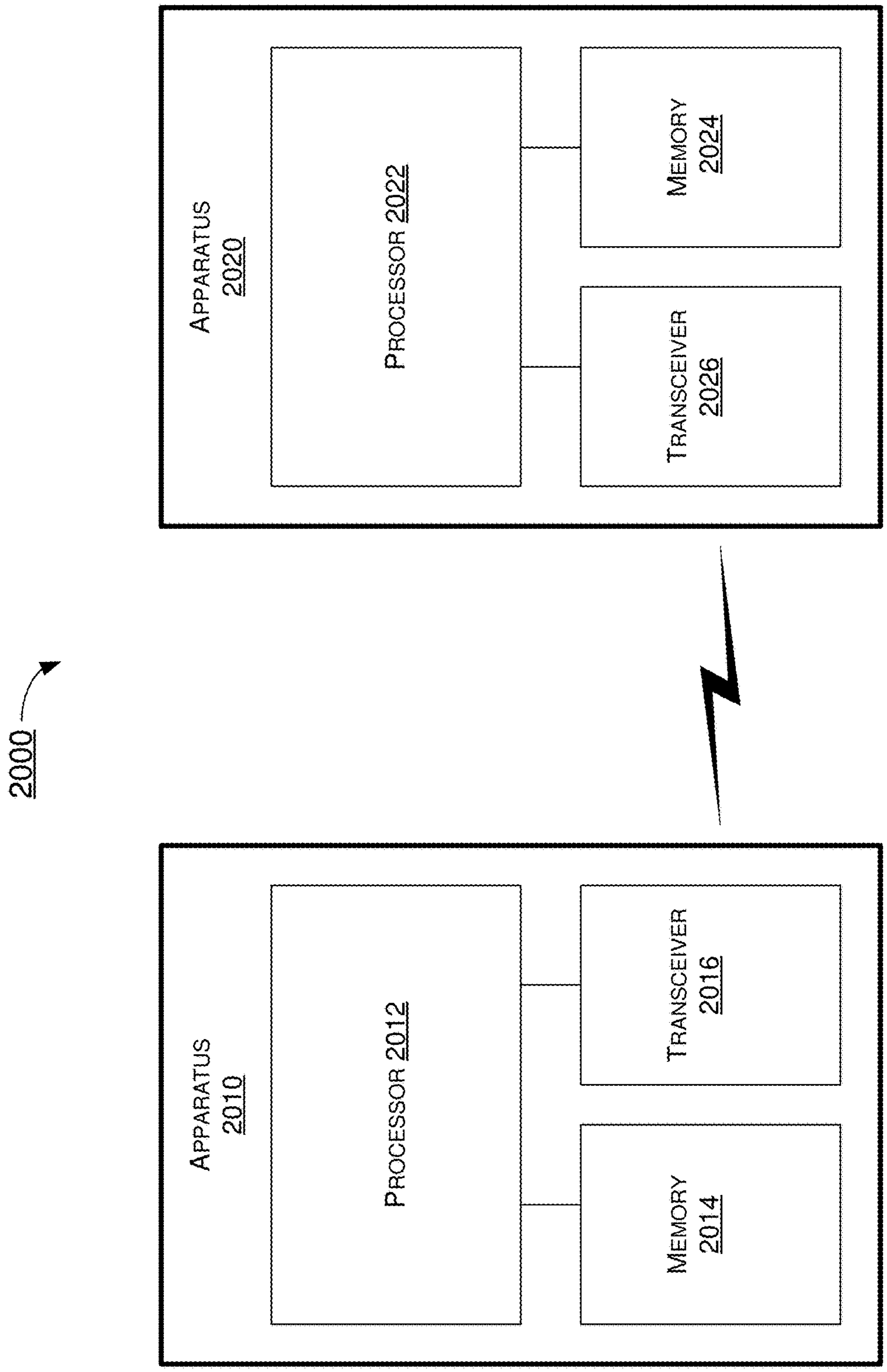

FIG. 20 is a block diagram of an example communication system in accordance with an implementation of the present disclosure.

Figure 21:
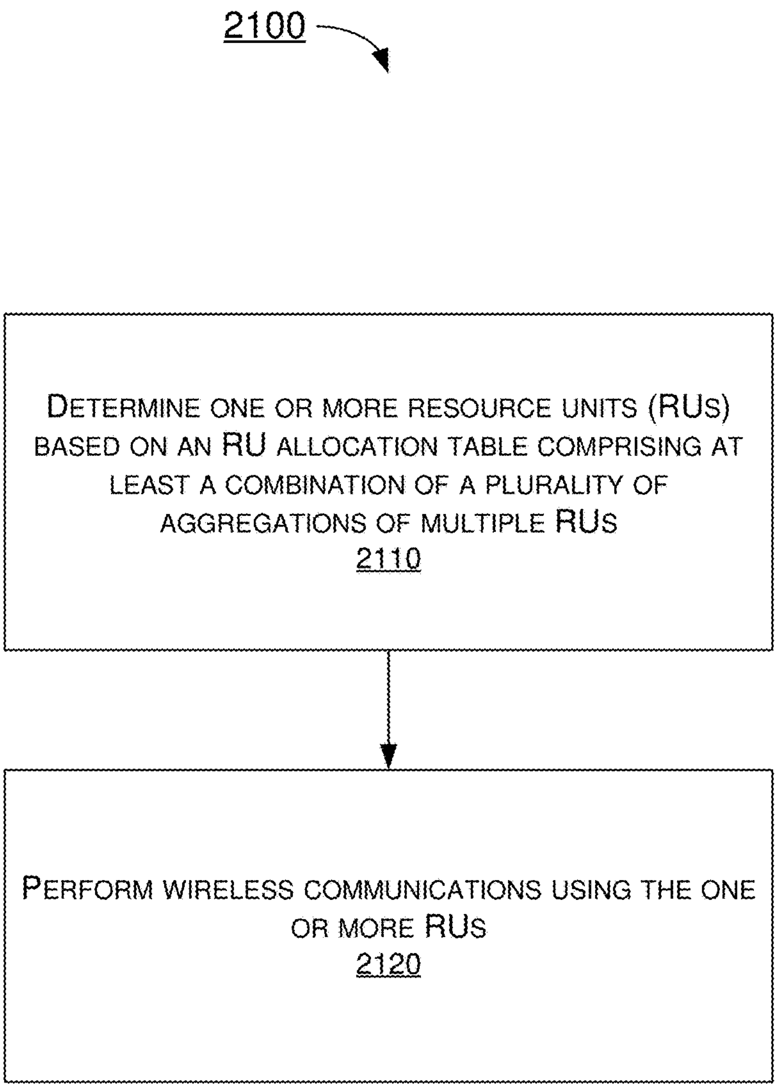

FIG. 21 is a flowchart of an example process in accordance with an implementation of the present disclosure.

Figure 22:
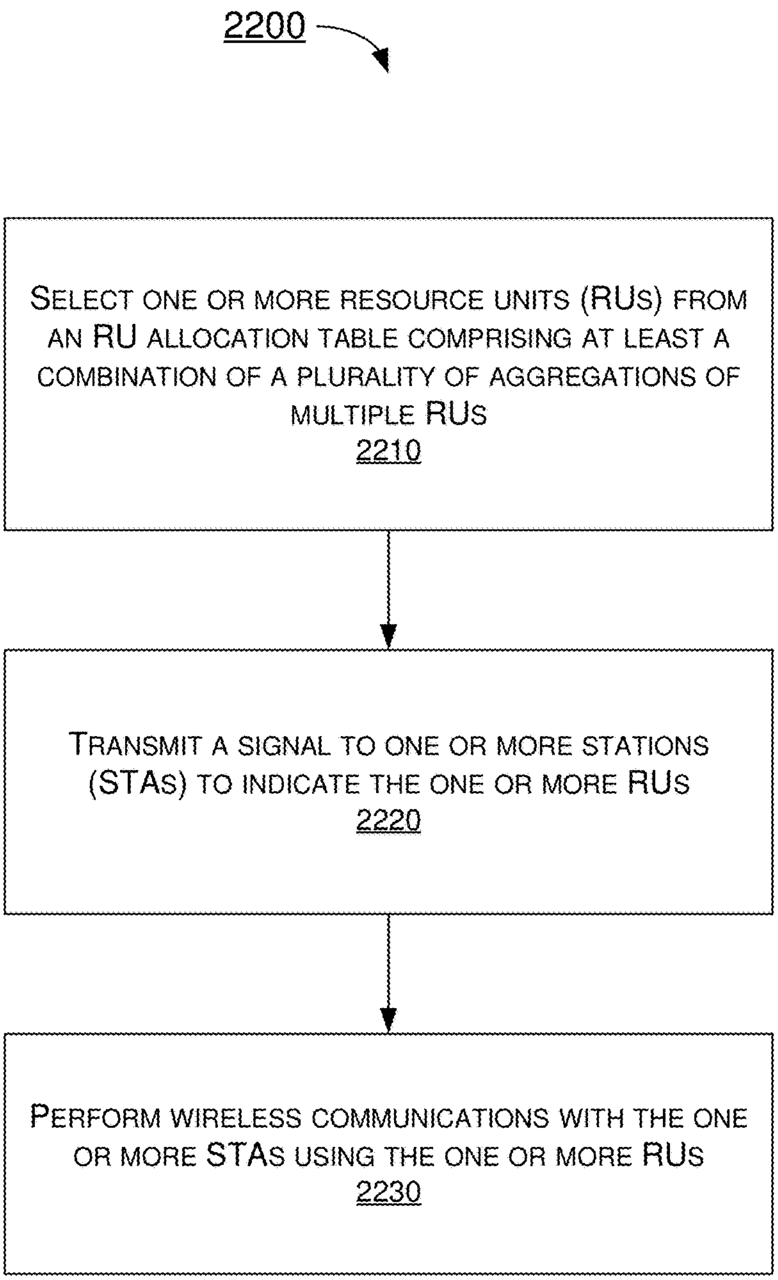

FIG. 22 is a flowchart of an example process in accordance with an implementation of the present disclosure.

Figure 23:
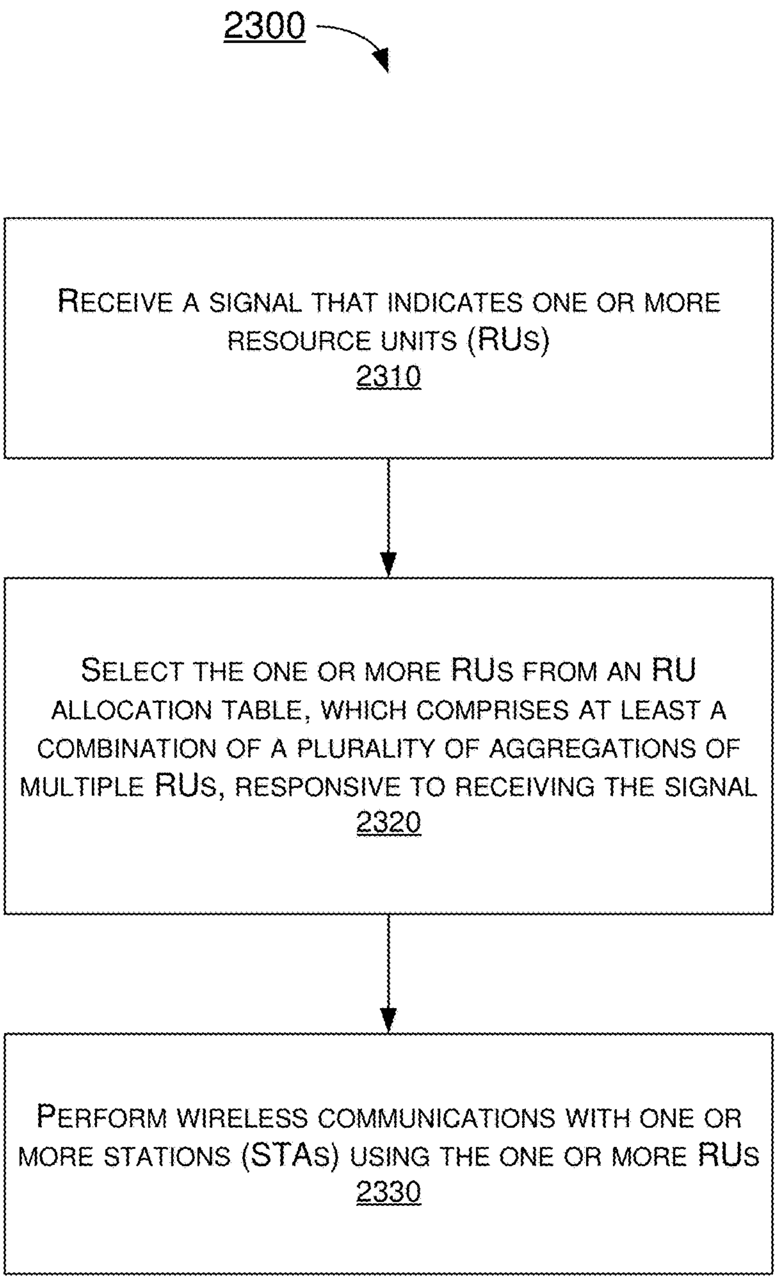

FIG. 23 is a flowchart of an example process in accordance with an implementation of the present disclosure.

DETAILED DESCRIPTION OF PREFERRED EMBODIMENTS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to enhanced RU allocation subfield design for EHT systems. According to the present disclosure, a number of possible solutions may be implemented separately or jointly. That is, although these possible solutions may be described below separately, two or more of these possible solutions may be implemented in one combination or another.

Figure 1:
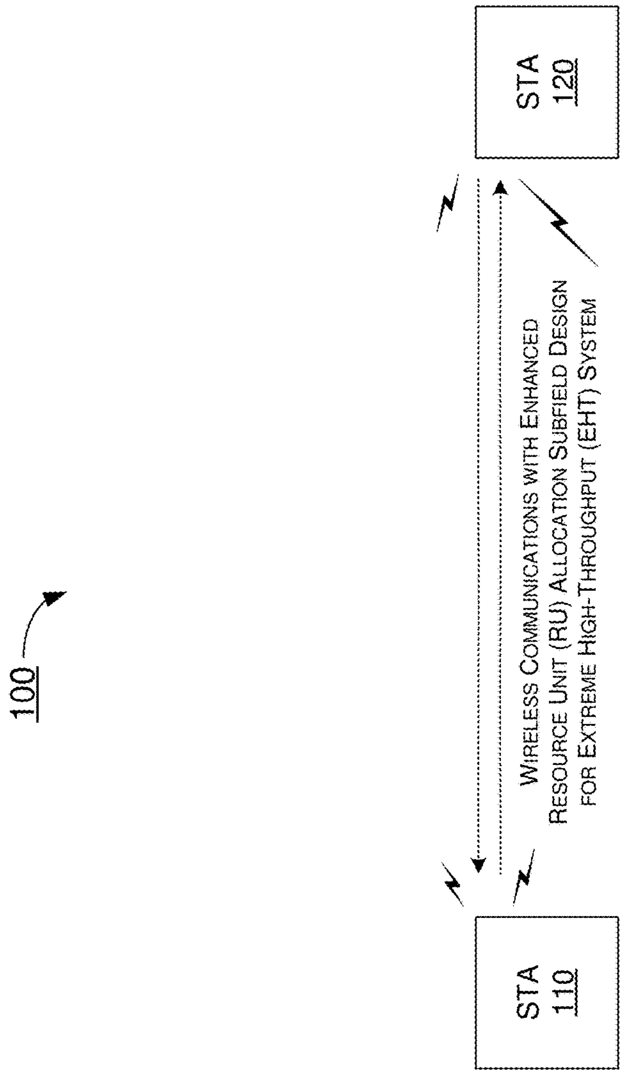
FIG. 1 is a diagram of an example network environment in which various solutions and schemes in accordance with the present disclosure may be implemented.

FIG. 1 illustrates an example network environment 100 in which various solutions and schemes in accordance with the present disclosure may be implemented. FIG. 2~FIG. 19B illustrate examples of implementation of various proposed schemes in network environment 100 in accordance with the present disclosure. The following description of various proposed schemes is provided with reference to FIG. 1~FIG. 19B.

Referring to FIG. 1, network environment 100 may involve at least a STA 110 communicating wirelessly with a STA 120. Each of STA 110 and STA 120 may be a non-access point (non-AP) STA or, alternatively, either of STA 110 and STA 120 may function as an AP. In some cases, STA 110 and STA 120 may be associated with a basic service set (BSS) in accordance with one or more IEEE 802.11 standards (e.g., IEEE 802.11be and future-developed standards). Each of STA 110 and STA 120 may be configured to communicate with each other utilizing the enhanced RU allocation subfield design for EHT systems in accordance with various proposed schemes described below. It is noteworthy that the term "RU" herein refers to both regular RUs and combination or aggregation of multiple RUs (herein interchangeably referred to as "aggregated RUs", "multi-RU" or "M-RU", or "MRU").

Under a proposed scheme in accordance with the present disclosure, an EHT signal (EHT-SIG) field (which is immediately after the user signal (U-SIG) field) in an EHT PPDU sent to multiple users may have a common field and user-specific field(s), with an RU allocation subfield in the common field of the EHT-SIG field. Specifically, with respect to an IEEE 802.11ax-based RU allocation subfield design for signaling of IEEE 802.11be EHT-SIG, a new RU allocation subfield supporting all multi-RU aggregation may be an extension of the IEEE 802.11ax RU allocation subfield by adding extra bits. For instance, one or two more bits may be added to the IEEE 802.11ax RU allocation subfield with one of the two bits used for indicating the RU size in the allocation subfield (e.g., a small-RU subfield for RUs with less than 242 tones or a large-RU subfield for RUs with at least 242 tones). For small RUs (<242 tones), it may be assumed that up to eight users can be supported for MU-MIMO on an RU or multi-RU with a size equal to or greater than 106 tones, or it may also be assumed that MU-MIMO should not be supported for small RU and small MRU. For larger RUs (≥242 tones), it may be assumed that up to sixteen users (or up to eight users) can be supported for MU-MIMO.

In IEEE 802.11be, an RU of 26 tones (RU26) and an RU of 52 tones (RU52) may be aggregated and assigned to a single STA. Additionally, the RU26 and an RU of 106 tones (RU106) may also be aggregated and assigned to a single STA. That is, for a 20-MHz and 40-MHz Physical Layer Convergence Procedure (PLCP) protocol data unit (PPDU), any contiguous RU26 and RU106 within the 20-MHz boundary may be combined, and an RU26 and an RU52 adjacent to each other with a one-tone or two-tone gap in between (and without crossing any channel boundary) may be combined. In case the same IEEE 802.11ax RU allocation subfield is used in a common field, this aggregation of RU26 and RU52 (or the aggregation of RU26 and RU106) could be indicated by duplicating a user-specific field twice with the same STA identification (STA-ID) in the user field. However, such approach would not be efficient, and each STA would need to continuously decode and monitor two user-specific fields. FIG. 2 illustrates an example subfield design 200 for small RUs in accordance with the present disclosure. FIG. 3A and FIG. 3B illustrate an example subfield design 300 for small MRUs in accordance with the present disclosure.

Accordingly, it is believed that indexing or labeling of the new RU allocation subfield may be well structured and suitable for implantation, and the IEEE 802.11ax-based RU allocation subfield may be flexible and simple to use while being backward compatible with the IEEE 802.11ax design. Moreover, it is believed that, under the proposed scheme, it may be easy to extend or expand the RU/multi-RU allocation table to support more RU combinations as well as a larger number of users for MU-MIMO in IEEE 802.11be or future WiFi technologies.

Under a proposed scheme in accordance with the present disclosure regarding large-RU aggregation, in 80-MHz OFDMA, aggregation of an RU of 484 tones (RU484) and an RU of 242 tones (RU242) for an aggregate bandwidth of 60 MHz may be supported. In 80-MHz non-OFDMA, conditional mandatory (conditional on puncturing being supported) aggregation of large RUs may be supported, with any one of four RU242 being punctured, including aggregation of RU484 and RU242. In 160-MHz OFDMA, aggregation of RU484 and an RU of 996 tones (RU996) for an aggregated bandwidth of 120 MHz may be supported. In 160-MHz non-OFDMA, conditional mandatory (conditional on puncturing being supported) aggregation of large RUs may be supported, with any one of eight RU242 or any one of four RU484 being punctured. For instance, aggregation of RU484 and RU996 for an aggregate bandwidth of 120 MHz may be supported, and aggregation of RU484+RU242 and RU996 for an aggregate bandwidth of 140 MHz may be supported.

Figure 5B:
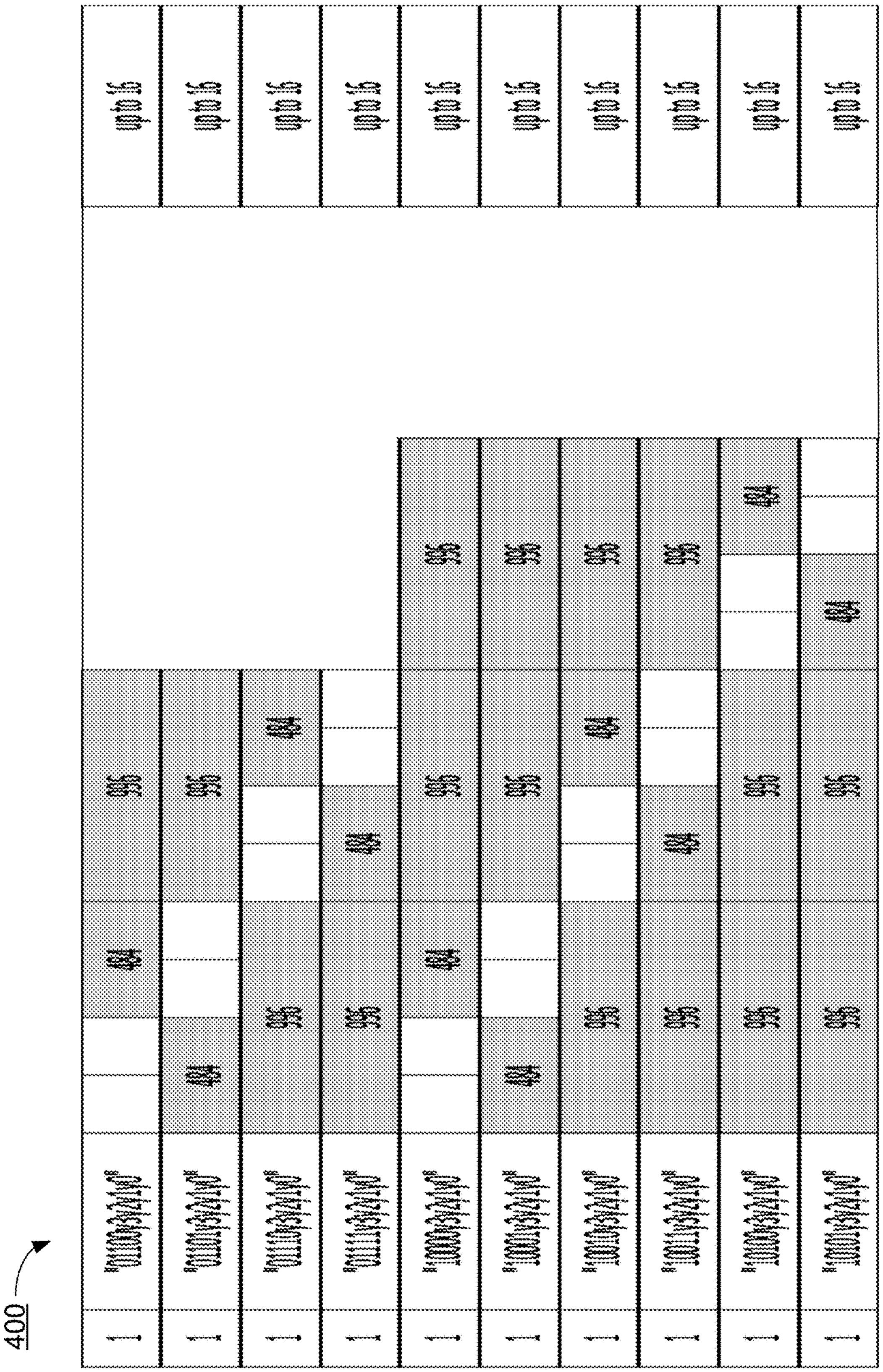

Each of FIG. 4A~4D illustrates a respective portion of an example subfield design 400 for large RUs in accordance with the present disclosure. Specifically, FIG. 4A shows a top first portion of design 400 of a large-RU allocation subfield, FIG. 4B shows a top second portion of design 400 of a large-RU allocation subfield, FIG. 4C shows a bottom first portion of design 400 of a large-RU allocation subfield and FIG. 4D shows a bottom second portion of design 400 of the large-RU allocation subfield. Each of FIG. 5A~5D illustrates a respective portion of an example subfield design 500 for large RUs in accordance with the present disclosure. Specifically, FIG. 5A shows a top first portion of design 500 of a large-RU and large-MRU allocation subfield, FIG. 5B shows a top second portion of design 500 of a large-RU and large-MRU allocation subfield, FIG. 5C shows a bottom first portion of design 500 of a large-RU and large-MRU allocation subfield and FIG. 5D shows a bottom second portion of design 500 of the large-RU and large-MRU allocation subfield. Some considerations of other options and further extension with respect to design 400 and design 500 are described below.

In the RU allocation subfield, B9="0" may indicate a small-RU/MRU allocation table, and B9="1" may indicate a large-RU/MRU allocation table. Alternatively, B9="1" may indicate a small-RU allocation table, and B9="0" may indicate a large-RU allocation table. Indexing "B8B7 . . . . B0" may be kept the same. Alternatively, instead of using the most-significant bit (MSB) B9 to indicate a small or larger-RU allocation table, the least-significant bit (LSB) B0 may be utilized to indicate a small or large-RU allocation table and using "B9B8 . . . . B1" to represent indexing. In such cases, "B9B8 . . . . B1" may have the similar bits assignment as "B8B7 . . . . B0".

For a small-RU/MRU allocation subfield, it may be assumed that the maximum number of MU-MIMO users on RU/M-RU greater than or equal to 106 tones is eight, and the maximum number of MU-MIMO users may be extended to other larger numbers such as twelve or sixteen or another number for future technologies. Accordingly, it may be necessary to add one or more bits to extend the RU allocation subfield. For a large-RU/MRU allocation subfield, it may be assumed that the maximum number of MU-MIMO users is up to sixteen or twelve, and the maximum number of MU-MIMO users may be extended to other larger numbers for future technologies by adding one or more bits for the RU allocation subfield indications. Similar methodology of IEEE 802.11ax-based RU allocation subfield design may be applied for future technologies with more RU combinations. Moreover, the structure or bit assignment of Bn . . . B1b0 may be further optimized or re-arranged. Additional RU allocation entries may also be added into the subfield by using the reserved entries for some special usage (e.g., assigning some special RU allocation entries for the commonly used scenarios to improve the EHT-SIG signaling efficiency).

Under the proposed scheme, for OFDMA transmissions in a contiguous 240-MHz bandwidth, large-RU aggregation for one STA may be allowed within a 160-MHz bandwidth which may be composed of two adjacent 80-MHz channels. For OFDMA transmissions in non-contiguous 160+80-MHz bandwidths, large-RU aggregation for one STA may be allowed within the contiguous 160-MHz bandwidth or the contiguous 80-MHz bandwidth, respectively. In 240-MHz non-OFDMA, conditional mandatory (conditional on puncturing being supported) aggregation of large RUs may be supported, with any one of six RU484 or any one of three RU969 being punctured. For instance, aggregation of RU484 and RU996 for an aggregate bandwidth of 200 MHz may be supported, and aggregation of RU996 and RU996 for an aggregate bandwidth of 160 MHz may be supported.

Under the proposed scheme, for OFDMA transmissions in a 320/160+80-MHz bandwidths, large-RU aggregation for one STA may be allowed within a primary 160-MHz bandwidth or a secondary 160-MHz bandwidth, respectively. The primary 160-MHz bandwidth may be composed of a primary 80-MHz bandwidth and a secondary 80-MHz bandwidth, and the secondary 160-MHz bandwidth may be a 160-MHz channel other than the primary 160-MHz bandwidth in the 320/160+80-MHz bandwidths. One exception may be that aggregation of three RU996s may be supported. In 320-MHz non-OFDMA, conditional mandatory (conditional on puncturing being supported) aggregation of large RUs may be supported, with any one of eight RU484 or any one of four RU969 being punctured. For instance, aggregation of RU484 and three RU996s for an aggregate bandwidth of 280 MHz may be supported, and aggregation of three RU996s for an aggregate bandwidth of 240 MHz may be supported.

Under a proposed scheme in accordance with the present disclosure, signaling of RU allocation with a page-overlay concept may be indicated by an "RU Allocation Mode" field. The number of bits (m-bits) used to indicate "RU Allocation Mode" may be any number of bits equal to or greater than one (e.g., one bit, two bits or three bits). Considering efficiency and multi-RU combination options for IEEE 802.11be and EHT systems, two bits may be ideal for indication of the RU allocation mode for EHT systems. The number of bits (n-bits) used to indicate "RU Allocation Subfield" may also be extended to nine bits or ten bits or more, other than eight bits as defined in IEEE 802.11ax to support the potential of additional RU aggregation scenarios and support a larger number of users on an RU or multi-RU for MU-MIMO (e.g., eight or sixteen or more users).

FIG. 6 illustrates an example design 600 of an overall RU allocation table in accordance with the present disclosure. The overall RU allocation table of design 600 may be utilized for wireless communications in accordance with IEEE 802.11be and future WiFi technologies. Referring to FIG. 6, in the overall RU allocation subfield a new column of "RU Allocation Mode" may be added to indicate, for example and without limitation, mode "00", mode "01" and mode "10". In the example shown in FIG. 6, the portion of the overall RU allocation table corresponding to RU allocation mode "00" may include an RU allocation subfield as defined in IEEE 802.11ax. Additionally, the portion of the overall RU allocation table corresponding to RU allocation mode "01" may include a small-RU/MRU allocation subfield for IEEE 802.11be (and/or future WiFi technologies). Moreover, the portion of the overall RU allocation table corresponding to RU allocation mode "10" may include a large-RU/MRU allocation subfield for IEEE 802.11be (and/or future WiFi technologies).

FIG. 7 illustrates an example design 700 in accordance with the present disclosure. Specifically, design 700 shows an example of common fields and user-specific fields in EHT-SIG of a communication system in accordance with IEEE 802.11be. There may be any number of bits (e.g., between two bits and eight bits) for RU allocation mode to indicate which RU allocation subfield is to be used for regular or single-RU scheduling, small-RU aggregation scheduling, or large-RU aggregation scheduling. The common field may be used to signal RU/multi-RU allocation and the number of users. The user-specific field may be used to signal per-user information.

FIG. 8 illustrates an example design 800 in accordance with the present disclosure. Specifically, design 800 shows an example of signaling of multi-RU allocation of larger-RU aggregation, small-RU aggregation and regular RU(s). In the common field, the index "01110011" denotes a 996-tone RU which contributes zero user field to the user-specific field in the same HE-SIG-B content channel as this RU allocation subfield. Moreover, in the common field, the index "01110010" denotes a 484-tone RU which contributes zero user field to the user-specific field in the same HE-SIG-B content channel as this RU allocation subfield.

FIG. 9 illustrates an example design 900 in accordance with the present disclosure. Specifically, design 900 shows another example of signaling of multi-RU allocation of larger-RU aggregation, small-RU aggregation and regular RU(s). In the common field, the index "01110011" denotes a 996-tone RU which contributes zero user field to the user-specific field in the same HE-SIG-B content channel as this RU allocation subfield. Moreover, in the common field, the index "01110010" denotes a 484-tone RU which contributes zero user field to the user-specific field in the same HE-SIG-B content channel as this RU allocation subfield.

Under a proposed scheme in accordance with the present disclosure, for EHT systems (e.g., in accordance with IEEE 802.11be), MU-MIMO may be on RU/M-RU with 242 or more tones and may support up to eight users per RU/M-RU. The RU allocation subfield may be 8-bit as with IEEE 802.11ax, and a hierarchical (tree) structure may be utilized for easy implementation. For instance, a table of RU allocation subfield may show, from top to bottom of the table, smaller RUs at the top, followed by combinations of smaller RUs and smaller M-RUs, followed by large RUs, and then followed by large M-RUs at the bottom of the table.

FIG. 10 illustrates an example design 1000 in accordance with the present disclosure. In design 1000, various RUs of 242 or more tones may be aggregated or otherwise combined to form respective M-RUs. For instance, referring to FIG. 10, there may be the following combinations/aggregations: an aggregation of an RU242 and an RU484 (denoted as "M-RU (242+484)" in FIG. 10), an aggregation of an RU484 and an RU996 (denoted as "M-RU (484+996)" in FIG. 10), an aggregation of three RU996s (denoted as "M-RU (3×996)" in FIG. 10), an aggregation of an RU484 and two RU996s (denoted as "M-RU (484+2×996)" in FIG. 10), an aggregation of an RU484 and three RU996s (denoted as "M-RU (484+3×996)" in FIG. 10), and an aggregation of two RU996s (denoted as "M-RU (2×996)" in FIG. 10). Both the M-RU (484+2×996) and M-RU (484+3×996) may be utilized for OFDMA. In design 1000, it may be possible for some of the combinations/aggregations to co-exist. For instance, M-RU (242+484) and M-RU (484+996) may co-exist. Similarly, M-RU (242+484) and M-RU (3×996) may co-exist. Likewise, M-RU (242+484) and M-RU (2×996) may co-exist. It is noteworthy that any other combinations/aggregations may not co-exist. Moreover, one benefit of non co-existing combinations/aggregations may be that some entries in the RU allocation subfield may be shared, thereby reducing the size of the table/subfield. When organized in a table format (e.g., as in design 400 shown in FIG. 4A~4D), the table may be presented in a hierarchical structure from smaller RU/M-RU toward the top of the table to larger RU/M-RU toward the bottom of the table. For instance, for the M-RU aggregations shown in FIG. 10 to be arranged from top to bottom in a table, M-RU (242+484) may be indicated at the top of the table, followed by M-RU (484+996), followed by M-RU (3×996), followed by M-RU (484+3×996), and then followed by M-RU (484+2×996) at the bottom of the table.

Under a proposed scheme in accordance with the present disclosure, there may be two options to RU allocation subfield design. FIG. 11A~FIG. 14, as described below, represent a first option (Option-1) of the two options. FIG. 17~FIG. 19B, as described below, represent the second option (Option-2) of the two options.

FIG. 11A and FIG. 11B illustrate an example design 1100 in accordance with the present disclosure. Under Option-1, one assumption made is that MU-MIMO may be allowed on RU/M-RU of 242 or more tones (RU/M-RU≥242), and another assumption is that up to eight users may be supported for MU-MIMO per RU/M-RU. In design 1100, bits in the subfield may be utilized to indicate specific RU/M-RUs. For instance, the most significant two bits of the 8-bit index, namely bits 7 and bits 6 (denoted as "b7b6" in FIG. 11A and FIG. 11B), may have values 00, 01, 10 and 11. Correspondingly, bits 5 and bits 4 (denoted as "b5b4" in FIG. 11A and FIG. 11B) may have values 00, 01, 10 and 11, and bits 5, bits 4 and bits 3 (denoted as "b5b4b3" in FIG. 11A and FIG. 11B) may have values 1z1z0 and 0z1z0. In the example shown in FIG. 11A and FIG. 11B, a value of "00" for the most significant two bits (b7b6) may indicate a portion of the RU allocation table/subfield where smaller RUs and/or smaller M-RUs (each with fewer than 242 tones) not supporting MU-MIMO are shown, and a value of "01" for the most significant two bits (b7b6) may indicate a portion of the RU allocation table/subfield where large single RUs (each with 242 or more tones) supporting MU-MIMO are shown. Moreover, a portion of the RU allocation table/subfield where large M-RUs (each with 242 or more tones) supporting MU-MIMO are shown may be indicated a value of "01", "10" or "11" for the most significant two bits (b7b6) and corresponding values for the next three bits (b5b4b3).

FIG. 12 illustrates an example design 1200 in accordance with the present disclosure. In design 1200 the subfield may have eight bits, B7B6B5B4B3B2B1B0 (denoted as "B7 . . . . B1B0" in FIG. 12), with the most significant four bits (B7B6B5B4) having values of 0000 and 0001 to indicate that the corresponding portion of the subfield shows small RUs (that is, RUs of fewer than 242 tones). For instance, entries 0~15 of the subfield may correspond to values 0000 of B7B6B5B4, and entries 16~31 of the subfield may correspond to values 0001 of B7B6B5B4.

FIG. 13 illustrates an example design 1300 in accordance with the present disclosure. Design 1300 may be an extension of the subfield of design 1200. In design 1300 the subfield may have eight bits, B7B6B5B4B3B2B1B0 (denoted as "B7 . . . . B1B0" in FIG. 13), with the most significant four bits (B7B6B5B4) having values of 0010 and 0011 to indicate that the corresponding portion of the subfield shows small RUs (that is, RUs of fewer than 242 tones) and aggregations of small RUs (that is, M-RUs of fewer than 242 tones). For instance, entries 32~47 of the subfield may correspond to values 0010 of B7B6B5B4 with some M-RUs of (52+26) tones, and entries 48~63 of the subfield may correspond to values 0011 of B7B6B5B4 with some M-RUs of (52+26) tones and some M-RUs of (106+26) tones.

FIG. 14 illustrates an example design 1400 in accordance with the present disclosure. Design 1400 may be an extension of the subfield of designs 1200 and 1300. In design 1400, multiple entries may share the same subfield value and correspond to the same large RU or M-RU. For instance, entries 64~71 may correspond to RU242, entries 72~79 may correspond to RU484, entries 80~87 may correspond to RU996, entries 88~95 may correspond to RU (2×996), entries 96~127 may correspond to M-RU (242+484), entries 128~159 may correspond to M-RU (484+996), entries 160~191 may correspond to M-RU (3×996), and entries 192~255 may correspond to M-RU (484+3×996) or M-RU (484+2×996).

FIG. 15 illustrates an example design 1500 in accordance with the present disclosure. Specifically, design 1500 shows some examples of large M-RU indexing such as M-RU (242+484), M-RU (484+996) and M-RU (3×996). In the examples shown in FIG. 15, "0" denotes open for else.

FIG. 16 illustrates an example design 1600 in accordance with the present disclosure. Specifically, design 1600 shows some examples of large M-RU indexing such as M-RU (484+2×996) and M-RU (484+3×996). In the examples shown in FIG. 16, "o" denotes open for else.

Under Option-2, large M-RUs for OFDMA may include M-RU (242+4840, M-RU (484+996) and M-RU (3×996), and large M-RUs for non-OFDMA may include M-RU (2×996), M-RU (484+2×996) and M-RU (484+3×996). Under Option-2, the 8-bit subfield for RU allocation signaling may be summarized below. The 8-bit index of "000x3x2x1x0" may signal RU26 or RU52 assignment combinations, which may be the same as in IEEE 802.11ax. The 8-bit index of "00100x1x0" ~"00110x1x0" may signal RU26/52+RU106, which may be the same as in IEEE 802.11ax but with no MU-MIMO on RU106. The 8-bit index of "001111x1x0" may signal RU242/484/996/2x996 with zero user. The 8-bit index of "010x1x0y2y1y0" may signal a large single RU (e.g., RU242/484/996/2×996) with MU-MIMO. For instance, RU242 may be signaled with x1x0 being 00, RU484 may be signaled with x1x0 being 01, RU996 may be signaled with x1x0 being 10, and RU2x996 may be signaled with x1x0 being 11. The 8-bit index of "1000x3x2x1x0" may signal M-RU (26+52) and RU26/52/106 assignment combinations. The 8-bit index of "1001x3x2x1x0" may signal M-RU (26+106) and RU26/52/106 assignment combinations. The 8-bit index of "101z1z0y2y1y0" may signal a large M-RU (242+484) with MU-MIMO. The 8-bit index of "110z1z0y2y1y0" may signal a large M-RU (484+996) with MU-MIMO. The 8-bit index of "111z1z0y2y1y0" may signal a large M-RU (3x996) with MU-MIMO. In each index the three least significant bits (y2y1y0) indicate the number of users up to eight, with 000 indicating one user and 111 indicating eight users.

FIG. 17 illustrates an example design 1700 in accordance with the present disclosure. In design 1700 the subfield may have eight bits, B7B6B5B4B3B2B1B0 (denoted as "B7 . . . . B1B0" in FIG. 17). Entries 0~15 of the subfield may be the same as in IEEE 802.11ax. Entries 16~27 of the subfield may correspond to small RUs. Entries 28~63 may correspond to larger RUs. Entries 62~127 may be reserved.

FIG. 18 illustrates an example design 1800 in accordance with the present disclosure. Design 1800 may be an extension of the subfield of design 1700. In design 1800 the subfield may have eight bits, B7B6B5B4B3B2B1B0 (denoted as "B7 . . . . B1B0" in FIG. 18). Entries 128~155 may correspond to small M-RU allocation combinations. Entries 156~159 may be reserved. Entries 160~255 may correspond to large M-RUs.

FIG. 19A and FIG. 19B illustrate an example design 1900 in accordance with the present disclosure. Design 1900 may be an alternative to design 1800, and design 1900 may be an extension of the subfield of design 1700. In design 1900 the subfield may have eight bits, B7B6B5B4B3B2B1B0 (denoted as "B7 . . . . B1B0" in FIG. 19A and FIG. 19B). Entries 128~157 may correspond to small M-RU allocation combinations. Entries 158~159 may be reserved. Entries 160~255 may correspond to large M-RUs. In entries 139~143, 156 and 157, it may be assumed that some edge RU26 or center RU26 is not assigned to any user.

Illustrative Implementations

FIG. 20 illustrates an example system 2000 having at least an example apparatus 2010 and an example apparatus 2020 in accordance with an implementation of the present disclosure. Each of apparatus 2010 and apparatus 2020 may perform various functions to implement schemes, techniques, processes and methods described herein pertaining to enhanced RU allocation subfield design for EHT systems, including the various schemes described above with respect to various proposed designs, concepts, schemes, systems and methods described above as well as processes described below. For instance, apparatus 2010 may be implemented in STA 110 and apparatus 2020 may be implemented in STA 120, or vice versa.

Each of apparatus 2010 and apparatus 2020 may be a part of an electronic apparatus, which may be a STA or an AP, such as a portable or mobile apparatus, a wearable apparatus, a wireless communication apparatus or a computing apparatus. When implemented in a STA, each of apparatus 2010 and apparatus 2020 may be implemented in a smartphone, a smart watch, a personal digital assistant, a digital camera, or a computing equipment such as a tablet computer, a laptop computer or a notebook computer. Each of apparatus 2010 and apparatus 2020 may also be a part of a machine type apparatus, which may be an IoT apparatus such as an immobile or a stationary apparatus, a home apparatus, a wire communication apparatus or a computing apparatus. For instance, each of apparatus 2010 and apparatus 2020 may be implemented in a smart thermostat, a smart fridge, a smart door lock, a wireless speaker or a home control center. When implemented in or as a network apparatus, apparatus 2010 and/or apparatus 2020 may be implemented in a network node, such as an AP in a WLAN.

In some implementations, each of apparatus 2010 and apparatus 2020 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. In the various schemes described above, each of apparatus 2010 and apparatus 2020 may be implemented in or as a STA or an AP. Each of apparatus 2010 and apparatus 2020 may include at least some of those components shown in FIG. 20 such as a processor 2012 and a processor 2022, respectively, for example. Each of apparatus 2010 and apparatus 2020 may further include one or more other components not pertinent to the proposed scheme of the present disclosure (e.g., internal power supply, display device and/or user interface device), and, thus, such component(s) of apparatus 2010 and apparatus 2020 are neither shown in FIG. 20 nor described below in the interest of simplicity and brevity.

In one aspect, each of processor 2012 and processor 2022 may be implemented in the form of one or more single-core processors, one or more multi-core processors, one or more RISC processors or one or more CISC processors. That is, even though a singular term "a processor" is used herein to refer to processor 2012 and processor 2022, each of processor 2012 and processor 2022 may include multiple processors in some implementations and a single processor in other implementations in accordance with the present disclosure. In another aspect, each of processor 2012 and processor 2022 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 2012 and processor 2022 is a special-purpose machine specifically designed, arranged and configured to perform specific tasks including those pertaining to enhanced RU allocation subfield design for EHT systems in accordance with various implementations of the present disclosure.

In some implementations, apparatus 2010 may also include a transceiver 2016 coupled to processor 2012. Transceiver 2016 may include a transmitter capable of wirelessly transmitting and a receiver capable of wirelessly receiving data. In some implementations, apparatus 2020 may also include a transceiver 2026 coupled to processor 2022. Transceiver 2026 may include a transmitter capable of wirelessly transmitting and a receiver capable of wirelessly receiving data. It is noteworthy that, although transceiver 2016 and transceiver 2026 are illustrated as being external to and separate from processor 2012 and processor 2022, respectively, in some implementations, transceiver 2016 may be an integral part of processor 2012 as a system on chip (SoC) and/or transceiver 2026 may be an integral part of processor 2022 as a SoC.

In some implementations, apparatus 2010 may further include a memory 2014 coupled to processor 2012 and capable of being accessed by processor 2012 and storing data therein. In some implementations, apparatus 2020 may further include a memory 2024 coupled to processor 2022 and capable of being accessed by processor 2022 and storing data therein. Each of memory 2014 and memory 2024 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 2014 and memory 2024 may include a type of read-only memory (ROM) such as mask ROM, programmable ROM (PROM), erasable programmable ROM (EPROM) and/or electrically erasable programmable ROM (EEPROM). Alternatively, or additionally, each of memory 2014 and memory 2024 may include a type of non-volatile random-access memory (NVRAM) such as flash memory, solid-state memory, ferroelectric RAM (FeRAM), magnetoresistive RAM (MRAM) and/or phase-change memory.

Each of apparatus 2010 and apparatus 2020 may be a communication entity capable of communicating with each other using various proposed schemes in accordance with the present disclosure. For illustrative purposes and without limitation, a description of capabilities of apparatus 2010, as STA 110, and apparatus 2020, as STA 120, is provided below. It is noteworthy that, although a detailed description of capabilities, functionalities and/or technical features of apparatus 2010 is provided below, the same may be applied to apparatus 2020 although a detailed description thereof is not provided solely in the interest of brevity. It is also noteworthy that, although the example implementations described below are provided in the context of WLAN, the same may be implemented in other types of networks.

Under a proposed scheme pertaining to enhanced RU allocation subfield design for EHT systems in accordance with the present disclosure, with apparatus 2010 implemented in or as STA 110 and apparatus 2020 implemented in or as STA 120 in network environment 100, processor 2012 of apparatus 2010 may determine one or more RUs based on an RU allocation table, which may include at least a combination of a plurality of aggregations of multiple RUs. Additionally, processor 2012 may perform, via transceiver 2016, wireless communications using the one or more RUs.

In some implementations, in performing the wireless communications, processor 2012 may perform a MU-MIMO transmission to a plurality of STAs (e.g., including apparatus 2020 as STA 120). In some implementations, in performing the MU-MIMO transmission, processor 2012 may perform the MU-MIMO transmission to up to eight STAs on a single RU of at least 242 tones or an aggregation of multiple RUs having at least 242 tones total.

In some implementations, the aggregations of multiple RUs may include an aggregation of an RU of 26 tones (RU26) and an RU of 52 tones (RU52), denotes as MRU (26+52). Alternatively, the aggregations of multiple RUs may include an aggregation of an RU of 26 tones (RU26) and an RU of 106 tones (RU106), denotes as MRU (26+106).

In some implementations, the one or more RUs may include an aggregation of multiple RUs each of 242 or more tones. For instance, the aggregation of multiple RUs may include at least one of the following: (a) an aggregation of an RU of 242 tones (RU242) and an RU of 484 tones (RU484), denoted as MRU (242+484), (b) an aggregation of an RU of 484 tones (RU484) and an RU of 996 tones (RU996), denoted as MRU (484+996), (c) an aggregation of three RUs each of 996 tones (RU996), denoted as MRU (3×996), (d) an aggregation of an RU of 484 tones (RU484) and two RUs each of 996 tones (RU996), denoted as MRU (484+2×996), and (e) an aggregation of an RU of 484 tones (RU484) and three RUs each of 996 tones (RU996), denoted as MRU (484+3×996). In some implementations, the aggregation of multiple RUs may support OFDMA.

In some implementations, contents of the RU allocation table may be arranged in a hierarchical order from smaller single RUs of fewer than 242 tones and aggregations of smaller RUs to larger RUs of 242 or more tones and aggregations of larger RUs.

In some implementations, the RU allocation table may further include a portion of smaller single RUs each of fewer than 242 tones and being available for allocation for the wireless communications in accordance with the IEEE 802.11ax specification.

In some implementations, in determining the one or more RUs, processor 2012 may perform certain operations. For instance, processor 2012 may select the one or more RUs from the RU allocation table. Additionally, processor 2012 may transmit, via transceiver 2016, a signal to one or more STAs to indicate the selected one or more RUs to be used for the wireless communications. In some implementations, the signal may contain an 8-bit (or 9-bit or 10-bit) index with a value of most significant multiple bits of the 8-bit (or 9-bit or 10-bit) index indicating a respective portion of the RU allocation mode from which the one or more RUs are selected.

In some implementations, in determining the one or more RUs, processor 2012 may perform alternative operations. For instance, processor 2012 may receive, via transceiver 2016, a signal that indicates the one or more RUs to be used for the wireless communications. Moreover, processor 2012 may select the one or more RUs from the RU allocation table responsive to receiving the signal. In some implementations, the signal may contain an 8-bit (or 9-bit or 10-bit) index with a value of most significant multiple bits of the 8-bit (or 9-bit or 10-bit) index indicating a respective portion of the RU allocation mode from which the one or more RUs are selected.

Under another proposed scheme pertaining to enhanced RU allocation subfield design for EHT systems in accordance with the present disclosure, with apparatus 2010 implemented in or as STA 110 and apparatus 2020 implemented in or as STA 120 in network environment 100, processor 2012 of apparatus 2010 may select one or more RUs from an RU allocation table, which may include at least a combination of a plurality of aggregations of multiple RUs. Additionally, processor 2012 may transmit, via transceiver 2016, a signal to one or more STAs to indicate the one or more RUs. Moreover, processor 2012 may perform, via transceiver 2016, wireless communications with the one or more STAs (e.g., including apparatus 2020 as STA 120) using the one or more RUs.

In some implementations, the RU allocation table may further include a portion of smaller single RUs each of fewer than 242 tones and being available for allocation for the wireless communications in accordance with the IEEE 802.11ax specification. Additionally, contents of the RU allocation table may be arranged in a hierarchical order from smaller single RUs of fewer than 242 tones and aggregations of smaller RUs to larger RUs of 242 or more tones and aggregations of larger RUs. In such cases, the one or more RUs may include at least one of the following: (a) an aggregation of an RU of 26 tones (RU26) and an RU of 52 tones (RU52), denoted as MRU (26+52), (b) an aggregation of an RU of 26 tones (RU26) and an RU of 106 tones (RU106), denoted as MRU (26+106), (c) an aggregation of an RU of 242 tones (RU242) and an RU of 484 tones (RU484), denoted as MRU (242+484), (d) an aggregation of an RU of 484 tones (RU484) and an RU of 996 tones (RU996), denoted as MRU (484+996), (e) an aggregation of three RUs each of 996 tones (RU996), denoted as MRU (3×996), (f) an aggregation of an RU of 484 tones (RU484) and two RUs each of 996 tones (RU996), denoted as MRU (484+2×996), and (g) an aggregation of an RU of 484 tones (RU484) and three RUs each of 996 tones (RU996), denoted as MRU (484+3×996). In some implementations, the aggregation of multiple RUs may support OFDMA.

Under yet another proposed scheme pertaining to enhanced RU allocation subfield design for EHT systems in accordance with the present disclosure, with apparatus 2010 implemented in or as STA 110 and apparatus 2020 implemented in or as STA 120 in network environment 100, processor 2012 of apparatus 2010 may receive, via transceiver 2016, a signal that indicates one or more RUs. Moreover, processor 2012 may select the one or more RUs from an RU allocation table, which may include at least a combination of a plurality of aggregations of multiple RUs, responsive to receiving the signal. Furthermore, processor 2012 may perform, via transceiver 2016, wireless communications with one or more STAs (e.g., including apparatus 2020 as STA 120) using the one or more RUs.

In some implementations, the RU allocation table may further include a portion of smaller single RUs each of fewer than 242 tones and being available for allocation for the wireless communications in accordance with the IEEE 802.11ax specification. Additionally, contents of the RU allocation table may be arranged in a hierarchical order from smaller single RUs of fewer than 242 tones and aggregations of smaller RUs to larger RUs of 242 or more tones and aggregations of larger RUs. In such cases, the one or more RUs may include at least one of the following: (a) an aggregation of an RU of 26 tones (RU26) and an RU of 52 tones (RU52), denoted as MRU (26+52), (b) an aggregation of an RU of 26 tones (RU26) and an RU of 106 tones (RU106), denoted as MRU (26+106), (c) an aggregation of an RU of 242 tones (RU242) and an RU of 484 tones (RU484), denoted as MRU (242+484), (d) an aggregation of an RU of 484 tones (RU484) and an RU of 996 tones (RU996), denoted as MRU (484+996), (e) an aggregation of three RUs each of 996 tones (RU996), denoted as MRU (3×996), (f) an aggregation of an RU of 484 tones (RU484) and two RUs each of 996 tones (RU996), denoted as MRU (484+2×996), and (g) an aggregation of an RU of 484 tones (RU484) and three RUs each of 996 tones (RU996), denoted as MRU (484+3×996). In some implementations, the aggregation of multiple RUs may support OFDMA.

Illustrative Processes

FIG. 21 illustrates an example process 2100 in accordance with an implementation of the present disclosure. Process 2100 may represent an aspect of implementing various proposed designs, concepts, schemes, systems and methods described above. More specifically, process 2100 may represent an aspect of the proposed concepts and schemes pertaining to enhanced RU allocation subfield design for EHT systems in accordance with the present disclosure. Process 2100 may include one or more operations, actions, or functions as illustrated by one or more of blocks 2110 and 2120. Although illustrated as discrete blocks, various blocks of process 2100 may be divided into additional blocks, combined into fewer blocks, or eliminated, depending on the desired implementation. Moreover, the blocks/sub-blocks of process 2100 may be executed in the order shown in FIG. 21 or, alternatively in a different order. Furthermore, one or more of the blocks/sub-blocks of process 2100 may be executed repeatedly or iteratively. Process 2100 may be implemented by or in apparatus 2010 and apparatus 2020 as well as any variations thereof. Solely for illustrative purposes and without limiting the scope, process 2100 is described below in the context of apparatus 2010 implemented in or as STA 110 and apparatus 2020 implemented in or as STA 120 of a wireless network such as a WLAN in network environment 100 in accordance with one or more of IEEE 802.11 standards. Process 2100 may begin at block 2110.

At 2110, process 2100 may involve processor 2012 of apparatus 2010 (e.g., STA 110) determining one or more RUs based on an RU allocation table, which may include at least a combination of a plurality of aggregations of multiple RUs. Process 2100 may proceed from 2110 to 2120.

At 2120, process 2100 may involve processor 2012 performing, via transceiver 2016, wireless communications using the one or more RUs.

In some implementations, in performing the wireless communications, process 2100 may involve processor 2012 performing a MU-MIMO transmission to a plurality of STAs (e.g., including apparatus 2020 as STA 120). In some implementations, in performing the MU-MIMO transmission, process 2100 may involve processor 2012 performing the MU-MIMO transmission to up to eight STAs on a single RU of at least 242 tones or an aggregation of multiple RUs having at least 242 tones total.

In some implementations, the aggregations of multiple RUs may include an aggregation of an RU of 26 tones (RU26) and an RU of 52 tones (RU52), denotes as MRU (26+52). Alternatively, the aggregations of multiple RUs may include an aggregation of an RU of 26 tones (RU26) and an RU of 106 tones (RU106), denotes as MRU (26+106).

In some implementations, the one or more RUs may include an aggregation of multiple RUs each of 242 or more tones. For instance, the aggregation of multiple RUs may include at least one of the following: (a) an aggregation of an RU of 242 tones (RU242) and an RU of 484 tones (RU484), denoted as MRU (242+484), (b) an aggregation of an RU of 484 tones (RU484) and an RU of 996 tones (RU996), denoted as MRU (484+996), (c) an aggregation of three RUs each of 996 tones (RU996), denoted as MRU (3×996), (d) an aggregation of an RU of 484 tones (RU484) and two RUs each of 996 tones (RU996), denoted as MRU (484+2×996), and (e) an aggregation of an RU of 484 tones (RU484) and three RUs each of 996 tones (RU996), denoted as MRU (484+3×996). In some implementations, the aggregation of multiple RUs may support OFDMA.

In some implementations, contents of the RU allocation table may be arranged in a hierarchical order from smaller single RUs of fewer than 242 tones and aggregations of smaller RUs to larger RUs of 242 or more tones and aggregations of larger RUs.

In some implementations, the RU allocation table may further include a portion of smaller single RUs each of fewer than 242 tones and being available for allocation for the wireless communications in accordance with the IEEE 802.11ax specification.

In some implementations, in determining the one or more RUs, process 2100 may involve processor 2012 performing certain operations. For instance, process 2100 may involve processor 2012 selecting the one or more RUs from the RU allocation table. Additionally, process 2100 may involve processor 2012 transmitting, via transceiver 2016, a signal to one or more STAs to indicate the selected one or more RUs to be used for the wireless communications. In some implementations, the signal may contain an 8-bit (or 9-bit or 10-bit) index with a value of most significant multiple bits of the 8-bit (or 9-bit or 10-bit) index indicating a respective portion of the RU allocation mode from which the one or more RUs are selected.

In some implementations, in determining the one or more RUs, process 2100 may involve processor 2012 performing alternative operations. For instance, process 2100 may involve processor 2012 receiving, via transceiver 2016, a signal that indicates the one or more RUs to be used for the wireless communications. Moreover, process 2100 may involve processor 2012 selecting the one or more RUs from the RU allocation table responsive to receiving the signal. In some implementations, the signal may contain an 8-bit (or 9-bit or 10-bit) index with a value of most significant multiple bits of the 8-bit (or 9-bit or 10-bit) index indicating a respective portion of the RU allocation mode from which the one or more RUs are selected.

FIG. 22 illustrates an example process 2200 in accordance with an implementation of the present disclosure. Process 2200 may represent an aspect of implementing various proposed designs, concepts, schemes, systems and methods described above. More specifically, process 2200 may represent an aspect of the proposed concepts and schemes pertaining to enhanced RU allocation subfield design for EHT systems in accordance with the present disclosure. Process 2200 may include one or more operations, actions, or functions as illustrated by one or more of blocks 2210, 2220 and 2230. Although illustrated as discrete blocks, various blocks of process 2200 may be divided into additional blocks, combined into fewer blocks, or eliminated, depending on the desired implementation. Moreover, the blocks/sub-blocks of process 2200 may be executed in the order shown in FIG. 22 or, alternatively in a different order. Furthermore, one or more of the blocks/sub-blocks of process 2200 may be executed repeatedly or iteratively. Process 2200 may be implemented by or in apparatus 2010 and apparatus 2020 as well as any variations thereof. Solely for illustrative purposes and without limiting the scope, process 2200 is described below in the context of apparatus 2010 implemented in or as STA 110 and apparatus 2020 implemented in or as STA 120 of a wireless network such as a WLAN in network environment 100 in accordance with one or more of IEEE 802.11 standards. Process 2200 may begin at block 2210.

At 2210, process 2200 may involve processor 2012 of apparatus 2010 (e.g., STA 110) selecting one or more RUs from an RU allocation table, which may include at least a combination of a plurality of aggregations of multiple RUs. Process 2200 may proceed from 2210 to 2220.

At 2220, process 2200 may involve processor 2012 transmitting, via transceiver 2016, a signal to one or more STAs to indicate the one or more RUs. Process 2200 may proceed from 2220 to 2230.

At 2230, process 2200 may involve processor 2012 performing, via transceiver 2016, wireless communications with the one or more STAs (e.g., including apparatus 2020 as STA 120) using the one or more RUs.

In some implementations, the RU allocation table may further include a portion of smaller single RUs each of fewer than 242 tones and being available for allocation for the wireless communications in accordance with the IEEE 802.11ax specification. Additionally, contents of the RU allocation table may be arranged in a hierarchical order from smaller single RUs of fewer than 242 tones and aggregations of smaller RUs to larger RUs of 242 or more tones and aggregations of larger RUs. In such cases, the one or more RUs may include at least one of the following: (a) an aggregation of an RU of 26 tones (RU26) and an RU of 52 tones (RU52), denoted as MRU (26+52), (b) an aggregation of an RU of 26 tones (RU26) and an RU of 106 tones (RU106), denoted as MRU (26+106), (c) an aggregation of an RU of 242 tones (RU242) and an RU of 484 tones (RU484), denoted as MRU (242+484), (d) an aggregation of an RU of 484 tones (RU484) and an RU of 996 tones (RU996), denoted as MRU (484+996), (e) an aggregation of three RUs each of 996 tones (RU996), denoted as MRU (3×996), (f) an aggregation of an RU of 484 tones (RU484) and two RUs each of 996 tones (RU996), denoted as MRU (484+2×996), and (g) an aggregation of an RU of 484 tones (RU484) and three RUs each of 996 tones (RU996), denoted as MRU (484+3×996). In some implementations, the aggregation of multiple RUs may support OFDMA.

FIG. 23 illustrates an example process 2300 in accordance with an implementation of the present disclosure. Process 2300 may represent an aspect of implementing various proposed designs, concepts, schemes, systems and methods described above. More specifically, process 2300 may represent an aspect of the proposed concepts and schemes pertaining to enhanced RU allocation subfield design for EHT systems in accordance with the present disclosure. Process 2300 may include one or more operations, actions, or functions as illustrated by one or more of blocks 2310, 2320 and 2330. Although illustrated as discrete blocks, various blocks of process 2300 may be divided into additional blocks, combined into fewer blocks, or eliminated, depending on the desired implementation. Moreover, the blocks/sub-blocks of process 2300 may be executed in the order shown in FIG. 23 or, alternatively in a different order. Furthermore, one or more of the blocks/sub-blocks of process 2300 may be executed repeatedly or iteratively. Process 2300 may be implemented by or in apparatus 2010 and apparatus 2020 as well as any variations thereof. Solely for illustrative purposes and without limiting the scope, process 2300 is described below in the context of apparatus 2010 implemented in or as STA 110 and apparatus 2020 implemented in or as STA 120 of a wireless network such as a WLAN in network environment 100 in accordance with one or more of IEEE 802.11 standards. Process 2300 may begin at block 2310.

At 2310, process 2300 may involve processor 2012 of apparatus 2010 (e.g., STA 110) receiving, via transceiver 2016, a signal that indicates one or more RUs. Process 2300 may proceed from 2310 to 2320.

At 2320, process 2300 may involve processor 2012 selecting the one or more RUs from an RU allocation table, which may include at least a combination of a plurality of aggregations of multiple RUs, responsive to receiving the signal. Process 2300 may proceed from 2320 to 2330.

At 2330, process 2300 may involve processor 2012 performing, via transceiver 2016, wireless communications with one or more STAs (e.g., including apparatus 2020 as STA 120) using the one or more RUs.

In some implementations, the RU allocation table may further include a portion of smaller single RUs each of fewer than 242 tones and being available for allocation for the wireless communications in accordance with the IEEE 802.11ax specification. Additionally, contents of the RU allocation table may be arranged in a hierarchical order from smaller single RUs of fewer than 242 tones and aggregations of smaller RUs to larger RUs of 242 or more tones and aggregations of larger RUs. In such cases, the one or more RUs may include at least one of the following: (a) an aggregation of an RU of 26 tones (RU26) and an RU of 52 tones (RU52), denoted as MRU (26+52), (b) an aggregation of an RU of 26 tones (RU26) and an RU of 106 tones (RU106), denoted as MRU (26+106), (c) an aggregation of an RU of 242 tones (RU242) and an RU of 484 tones (RU484), denoted as MRU (242+484), (d) an aggregation of an RU of 484 tones (RU484) and an RU of 996 tones (RU996), denoted as MRU (484+996), (e) an aggregation of three RUs each of 996 tones (RU996), denoted as MRU (3×996), (f) an aggregation of an RU of 484 tones (RU484) and two RUs each of 996 tones (RU996), denoted as MRU (484+2×996), and (g) an aggregation of an MRU of 484 tones (RU484) and three RUs each of 996 tones (RU996), denoted as MRU (484+3×996). In some implementations, the aggregation of multiple RUs may support OFDMA.

ADDITIONAL NOTES

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:

determining one or more resource units (RUs) based on an RU allocation table; and performing wireless communications using the one or more RUs, wherein the RU allocation table comprises at least a combination of a plurality of aggregations of multiple RUs, wherein the determining of the one or more RUs comprises performing either a first procedure or a second procedure, wherein the first procedure comprises:

selecting the one or more RUs from the RU allocation table; and transmitting a first signal to one or more stations (STAs) to indicate the selected one or more RUs to be used for the wireless communications, wherein the second procedure comprises:

receiving a second signal that indicates the one or more RUs to be used for the wireless communications; and selecting the one or more RUs from the RU allocation table responsive to receiving the second signal, wherein each of the first signal and the second signal contains a 9-bit index with a value indicating a respective portion of RU allocation from which the one or more RUs are selected from the RU allocation table, wherein two most-significant bits (MSBs) of the 9-bit index indicate whether the RU allocation table is a small-RU allocation table for RUs equal to and fewer than 106 tones a large-RU allocation table for RUs equal to and more than 242 tones and single RUs equal to and more than 242 tones, and wherein the performing of the wireless communications comprises signaling a RU Allocation Mode field indicating the RU allocation table, among a plurality of RU allocation tables, to be used for small multi-RU scheduling, large multi-RU scheduling or regular single-RU scheduling.

2. The method of claim 1, wherein the performing of the wireless communications comprises performing a multi-user multiple-input-multiple-output (MU-MIMO) transmission to a plurality of STAs comprising the one or more STAs.

3. The method of claim 2, wherein the performing of the MU-MIMO transmission comprises performing the MU-MIMO transmission to up to eight STAs on a single RU of at least 242 tones or an aggregation of multiple RUs having at least 242 tones total.

4. The method of claim 1, wherein the aggregations of multiple RUs comprise an aggregation of an RU of 26 tones (RU26) and an RU of 52 tones (RU52), denotes as MRU (26+52).

5. The method of claim 1, wherein the aggregations of multiple RUs comprise an aggregation of an RU of 26 tones (RU26) and an RU of 106 tones (RU106), denotes as MRU (26+106).

6. The method of claim 1, wherein the one or more RUs comprise an aggregation of multiple RUs each of 242 or more tones.

7. The method of claim 6, wherein the aggregation of multiple RUs comprise an aggregation of an RU of 242 tones (RU242) and an RU of 484 tones (RU484), denoted as MRU (242+484).

8. The method of claim 6, wherein the aggregation of multiple RUs comprise an aggregation of an RU of 484 tones (RU484) and an RU of 996 tones (RU996), denoted as MRU (484+996).

9. The method of claim 6, wherein the aggregation of multiple RUs comprise an aggregation of three RUs each of 996 tones (RU996), denoted as MRU (3×996).

10. The method of claim 6, wherein the aggregation of multiple RUs comprise an aggregation of an RU of 484 tones (RU484) and two RUs each of 996 tones (RU996), denoted as MRU (484+2×996).

11. The method of claim 6, wherein the aggregation of multiple RUs comprise an aggregation of an RU of 484 tones (RU484) and three RUs each of 996 tones (RU996), denoted as MRU (484+3×996).

12. The method of claim 6, wherein the aggregation of multiple RUs supports orthogonal frequency division multiple access (OFDMA).

13. The method of claim 1, wherein contents of the RU allocation table are arranged in a hierarchical order from smaller single RUs of fewer than 242 tones and aggregations of smaller RUs to larger RUs of 242 or more tones and aggregations of larger RUs.

14. The method of claim 1, wherein the RU allocation table further comprises a portion of smaller single RUs each of fewer than 242 tones and being available for allocation for the wireless communications in accordance with an Institute of Electrical and Electronics Engineers (IEEE) 802.11ax specification.

15. A method, comprising:

selecting one or more resource units (RUs) from an RU allocation table;

transmitting a signal to one or more stations (STAs) to indicate the one or more RUs; and performing wireless communications with the one or more STAs using the one or more RUs, wherein the RU allocation table comprises at least a combination of a plurality of aggregations of multiple RUs, wherein the signal contains a 9-bit index with a value indicating a respective portion of RU allocation from which the one or more RUs are selected, wherein two most-significant bit (MSBs) of the 9-bit index indicate whether the RU allocation table is a small-RU allocation table for RUs equal to and fewer than 106 tones a large-RU allocation table for RUs equal to and more than 242 tones and single RUs equal to and more than 242 tones, and wherein the signal further contains a RU Allocation Mode field indicating the RU allocation table, among a plurality of RU allocation tables, to be used for small multi-RU scheduling, large multi-RU scheduling or regular single-RU scheduling.

16. The method of claim 15, wherein the RU allocation table further comprises a portion of smaller single RUs each of fewer than 242 tones and being available for allocation for the wireless communications in accordance with an Institute of Electrical and Electronics Engineers (IEEE) 802.11ax specification, wherein contents of the RU allocation table are arranged in a hierarchical order from smaller single RUs of fewer than 242 tones and aggregations of smaller RUs to larger RUs of 242 or more tones and aggregations of larger RUs, and wherein the one or more RUs comprise at least one of:

an aggregation of an RU of 26 tones (RU26) and an RU of 52 tones (RU52), denoted as MRU (26+52), an aggregation of an RU of 26 tones (RU26) and an RU of 106 tones (RU106), denoted as MRU (26+106), an aggregation of an RU of 242 tones (RU242) and an RU of 484 tones (RU484), denoted as MRU (242+484), an aggregation of an RU of 484 tones (RU484) and an RU of 996 tones (RU996), denoted as MRU (484+996), an aggregation of three RUs each of 996 tones (RU996), denoted as MRU (3×996), an aggregation of an RU of 484 tones (RU484) and two RUs each of 996 tones (RU996), denoted as MRU (484+2×996), and an aggregation of an RU of 484 tones (RU484) and three RUs each of 996 tones (RU996), denoted as MRU (484+3×996).

17. A method, comprising:

receiving a signal that indicates one or more resource units (RUS);

selecting the one or more RUs from an RU allocation table responsive to receiving the signal; and performing wireless communications with one or more stations (STAs) using the one or more RUs, wherein the signal contains a 9-bit index with a value indicating a respective portion of RU allocation from which the one or more RUs are selected, wherein two most-significant bit (MSBs) of the 9-bit index indicate whether the RU allocation table is a small-RU allocation table for RUs equal to and fewer than 106 tones a large-RU allocation table for RUs equal to and more than 242 tones and single RUs equal to and more than 242 tones, and wherein the signal further contains a RU Allocation Mode field indicating the RU allocation table, among a plurality of RU allocation tables, to be used for small multi-RU scheduling, large multi-RU scheduling or regular single-RU scheduling.

18. The method of claim 17, wherein the RU allocation table further comprises a portion of smaller single RUs each of fewer than 242 tones and being available for allocation for the wireless communications in accordance with an Institute of Electrical and Electronics Engineers (IEEE) 802.11ax specification, wherein contents of the RU allocation table are arranged in a hierarchical order from smaller single RUs of fewer than 242 tones and aggregations of smaller RUs to larger RUs of 242 or more tones and aggregations of larger RUs, and wherein the one or more RUs comprise at least one of:

an aggregation of an RU of 26 tones (RU26) and an RU of 52 tones (RU52), denoted as MRU (26+52), an aggregation of an RU of 26 tones (RU26) and an RU of 106 tones (RU106), denoted as MRU (26+106), an aggregation of an RU of 242 tones (RU242) and an RU of 484 tones (RU484), denoted as MRU (242+484), an aggregation of an RU of 484 tones (RU484) and an RU of 996 tones (RU996), denoted as MRU (484+996), an aggregation of three RUs each of 996 tones (RU996), denoted as MRU (3×996), an aggregation of an RU of 484 tones (RU484) and two RUs each of 996 tones (RU996), denoted as MRU (484+2×996), and an aggregation of an RU of 484 tones (RU484) and three RUs each of 996 tones (RU996), denoted as MRU (484+3×996).

19. An apparatus, comprising:

a transceiver configured to communicate wirelessly; and a processor coupled to the transceiver and configured to perform operations comprising:

selecting one or more resource units (RUs) from an RU allocation table;

transmitting, via the transceiver, a signal to one or more stations (STAs) to indicate the one or more RUs; and performing, via the transceiver, wireless communications with the one or more STAs using the one or more RUs, wherein the signal contains a 9-bit index with a value indicating a respective portion of RU allocation from which the one or more RUs are selected, wherein two most-significant bit (MSBs) of the 9-bit index indicate whether the RU allocation table is a small-RU allocation table for RUs equal to and fewer than 106 tones a large-RU allocation table for RUs equal to and more than 242 tones and single RUs equal to and more than 242 tones, and wherein the signal further contains a RU Allocation Mode field indicating the RU allocation table, among a plurality of RU allocation tables, to be used for small multi-RU scheduling, large multi-RU scheduling or regular single-RU scheduling.

20. An apparatus, comprising:

a transceiver configured to communicate wirelessly; and a processor coupled to the transceiver and configured to perform operations comprising:

receiving, via the transceiver, a signal that indicates one or more resource units (RUS);

selecting the one or more RUs from an RU allocation table responsive to receiving the signal; and performing, via the transceiver, wireless communications with one or more stations (STAs) using the one or more RUS, wherein the signal contains a 9-bit index with a value indicating a respective portion of RU allocation from which the one or more RUs are selected, wherein two most-significant bit (MSBs) of the 9-bit index indicate whether the RU allocation table is a small-RU allocation table for RUs equal to and fewer than 106 tones a large-RU allocation table for RUs equal to and more than 242 tones and single RUs equal to and more than 242 tones, and wherein the signal further contains a RU Allocation Mode field indicating the RU allocation table, among a plurality of RU allocation tables, to be used for small multi-RU scheduling, large multi-RU scheduling or regular single-RU scheduling.

* * * * *